US012112693B1

(12) United States Patent
Sang et al.

(10) Patent No.: US 12,112,693 B1
(45) Date of Patent: Oct. 8, 2024

(54) DISPLAY DEVICE WITH DISPLAY PANEL AND CONTROLLER FOR DISPLAY PANEL

(71) Applicant: LG DISPLAY CO., LTD., Seoul (KR)

(72) Inventors: Wookyu Sang, Paju-si (KR); Moonsoo Chung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/224,374

(22) Filed: Jul. 20, 2023

(30) Foreign Application Priority Data

Jul. 28, 2022 (KR) ........................ 10-2022-0093956

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2310/0267* (2013.01); *G09G 2320/0233* (2013.01); *G09G 2320/0247* (2013.01); *G09G 2320/0271* (2013.01)

(58) Field of Classification Search
CPC ...... G09G 3/32–3291; G09G 2300/0421–043; G09G 2300/0809; G09G 2300/0819; G09G 2300/0842; G09G 2300/0861; G09G 2300/0866; G09G 2310/0264–0272; G09G 2310/0289; G09G 2310/04; G09G 2310/06; G09G 2310/067; G09G 2310/08; G09G 2320/0233; G09G 2320/0247; G09G 2320/0271; G09G 2320/043; G09G 2320/045
See application file for complete search history.

(56) References Cited

U.S. PATENT DOCUMENTS 11,271,181 B1 * 3/2022 Yang .................... G09G 3/2092
2015/0002560 A1 * 1/2015 Kwon .................. G09G 3/3266 345/691
2016/0196802 A1 * 7/2016 Nho ......................... G09G 3/20 345/212
2016/0210908 A1 * 7/2016 Seki ..................... G09G 3/3614
2021/0233457 A1 * 7/2021 Xiong .................. G09G 3/2074
2022/0059011 A1 * 2/2022 Li ............................ G09G 3/20
2022/0335872 A1 * 10/2022 Zhang .................. G09G 3/3233

* cited by examiner

*Primary Examiner* — Nathan Danielsen

(74) *Attorney, Agent, or Firm* — Morgan, Lewis & Bockius LLP

(57) ABSTRACT

A display device according to the embodiment of the present disclosure includes: a display panel that includes a display area where a plurality of pixels is disposed and a non-display area disposed around the display area; a gate driver that provides a scan signal and an emission control signal to the display panel; and a controller that drives the display panel in accordance with a refresh rate. The plurality of pixels includes a light emitting element and a pixel circuit that drives the light emitting element. The pixel circuit is driven in sets including at least one refresh period and at least one hold period in low frequency driving. The controller controls dynamically the refresh rate during the at least one set when a gradation of an image changes, and simultaneously, changes and supplies a bias voltage during the at least one hold period.

33 Claims, 13 Drawing Sheets

DISPLAY DEVICE WITH DISPLAY PANEL AND CONTROLLER FOR DISPLAY PANEL

CROSS-REFERENCE TO RELATED APPLICATIONS

The present application claims priority to Korean Patent Application No. 10-2022-0093956, filed Jul. 28, 2022, the entire content of which is incorporated herein for all purposes by this reference.

BACKGROUND

Technical Field

The present disclosure relates to a display device, more particularly, for example, without limitation, to a display device using a variable refresh rate (VRR) mode, and the present disclosure intends to reduce the occurrence of flicker at a point of time of screen switching, by reducing the occurrence of difference in luminance at a point of time when a gradation of an image is changed, especially when the display device is driven at a low frequency in the VRR mode.

Discussion of the Related Art

A display device using a light emitting element such as an organic light emitting diode or an inorganic light emitting diode may be driven by various driving frequencies.

Recently, a variable refresh rate (VRR) is also required as one of various functions required for the display device. The VRR is a technology that drives pixels by increasing a refresh rate at a point of time when high-speed driving is required, while the display device is being driven at a constant frequency. In addition, the VRR is a technology that drives pixels by reducing the refresh rate at a point of time when it is necessary to reduce power consumption or when a low-speed driving is required.

The description provided in the background section should not be assumed to be prior art merely because it is mentioned in or associated with the background section. The background section may include information that describes one or more aspects of the subject technology.

SUMMARY

Due to flicker that occurs by the change of a gradation of an image, especially when the display device is driven at a low frequency in the VRR mode, screen switching may be perceived unnaturally by viewers. Accordingly, it is required to prevent viewers from perceiving the flicker due to the screen switching.

Accordingly, embodiments of the present disclosure are directed to a display device that substantially obviates one or more of the problems due to limitations and disadvantages of the related art.

The present disclosure relates to a display device using a variable refresh rate (VRR) mode. An aspect of the present disclosure is to provide a display device with reduced occurrence of flicker at a time point of screen switching by reducing the occurrence of difference in luminance at a point time when a gradation of an image is changed.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises: a display panel that includes a display area where a plurality of pixels is disposed and a non-display area disposed around the display area: a gate driver that provides a scan signal and an emission control signal to the display panel: and a controller that drives the display panel in accordance with a refresh rate. The plurality of pixels includes a light emitting element and a pixel circuit that drives the light emitting element. The pixel circuit is driven in sets including at least one refresh period and at least one hold period in low frequency driving. The controller controls dynamically the refresh rate during the at least one set when a gradation of an image changes, and simultaneously, changes and supplies a bias voltage during the at least one hold period.

The technical problem to be overcome in this document is not limited to the above-mentioned technical problems. Other technical problems not mentioned can be clearly understood from those described below by a person having ordinary skill in the art.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, that may be included to provide a further understanding of the disclosure and may be incorporated in and constitute a part of the disclosure, illustrate embodiments of the disclosure and together with the description serve to explain various principles of the disclosure.

Figure 1:
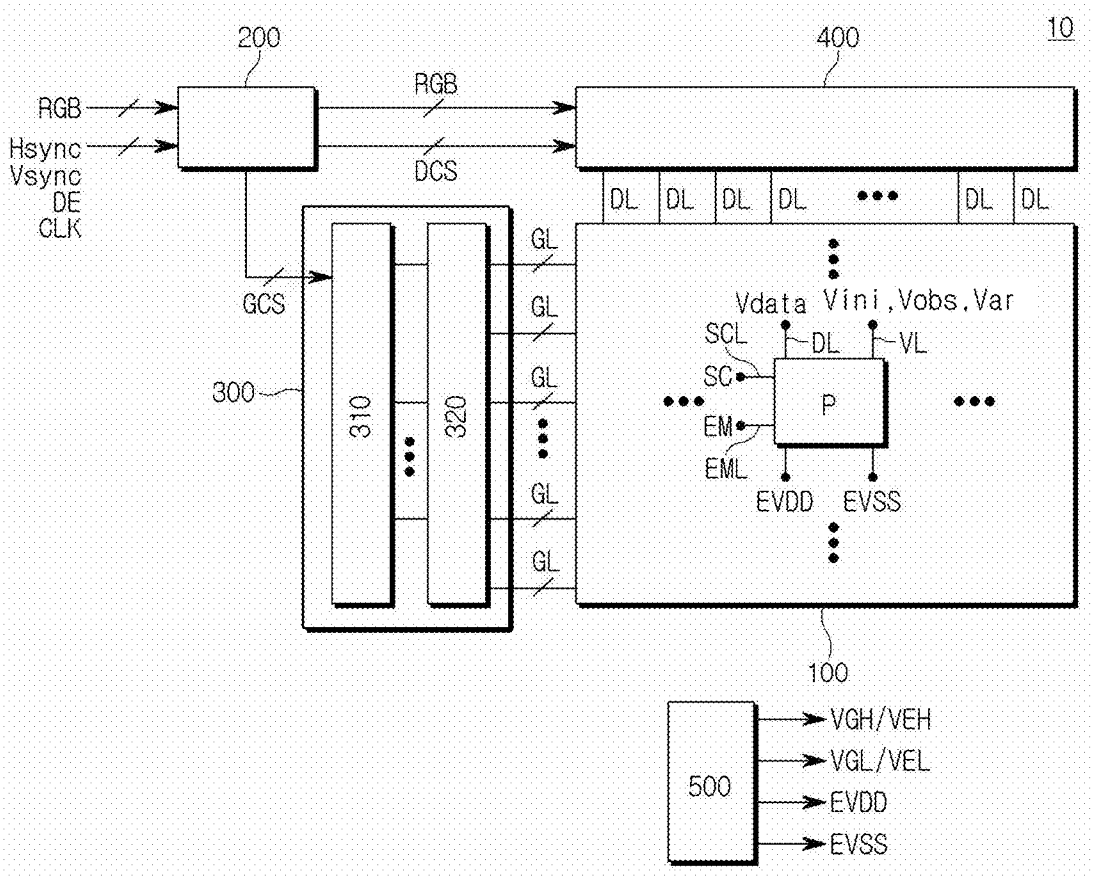
FIG. 1 is a block diagram showing schematically a display device according to an example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example: however, the sequence of steps and/or operations is not limited to that set forth herein and may be changed as is known in the art, with the exception of steps and/or operations necessarily occurring in a particular order. Names of the respective elements used in the following explanations may be selected only for convenience of writing the specification and may be thus different from those used in actual products.

The features, advantages and method for accomplishment of the present disclosure will be more apparent from referring to the following detailed embodiments described as well as the accompanying drawings. However, the present disclosure is not limited to the embodiment to be disclosed below and is implemented in different and various forms. The embodiments bring about the complete disclosure of the present disclosure and are only provided to make those skilled in the art fully understand the scope of the present disclosure. The present disclosure is just defined by the scope of the appended claims. The same reference numerals throughout the disclosure correspond to the same elements.

The shapes, sizes, ratios, angles, numbers, and the like, which are illustrated in the drawings to describe various example embodiments of the present disclosure are merely given by way of example. Therefore, the present disclosure is not limited to the illustrations in the drawings.

Any implementation described herein as an "example" is not necessarily to be construed as preferred or advantageous over other implementations.

In construing an element, the element is construed as including an error range or tolerance range although there is no explicit description of such an error or tolerance range.

In the description of the various embodiments of the present disclosure, where positional relationships are described, for example, when a position relation between two parts is described as, for example, "on," "over," "under," and "next," or the like, one or more other parts may be located between the two parts unless a more limiting term, such as "just" or "direct(ly)" is used. For example, where an element or layer is disposed "on" another element or layer, a third layer or element may be interposed therebetween.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present disclosure, and not intended to be limiting. In the present specification, an expression of a singular form includes the expression of plural form thereof if not specifically stated. The terms "comprises", "have", and "include" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

While terms such as the first and the second, A, B, (a), (b), etc., can be used to describe various components, the components are not limited by the terms mentioned above. The terms are used only for distinguishing between one component and other components.

The term "at least one" should be understood as including any and all combinations of one or more of the associated listed items. For example, the meaning of "at least one of a first element, a second element, and a third element" compasses the combination of all three listed elements, combinations of any two of the three elements, as well as each individual element, the first element, the second element, or the third element.

Therefore, the first component to be described below may be the second component within the spirit of the present disclosure. Unless differently defined, all terms used herein including technical and scientific terms have the same meaning as commonly understood by one of ordinary skill in the art to which the present disclosure belongs. Also, commonly used terms defined in the dictionary should not be ideally or excessively construed as long as the terms are not clearly and specifically defined in the present application.

FIG. 1 is a block diagram showing schematically a display device according to an example embodiment of the present disclosure.

Referring to FIG. 1, the display device 10 includes a display panel 100 including a plurality of pixels P, a controller 200, a gate driver 300 which provides a gate signal to each of the plurality of pixels P, a data driver 400 which provides a data signal to each of the plurality of pixels P, and a power supply 500 which supplies power required to drive the pixel to each of the plurality of pixels P. However, embodiments of the present disclosure are not limited to such example.

Figure 2:
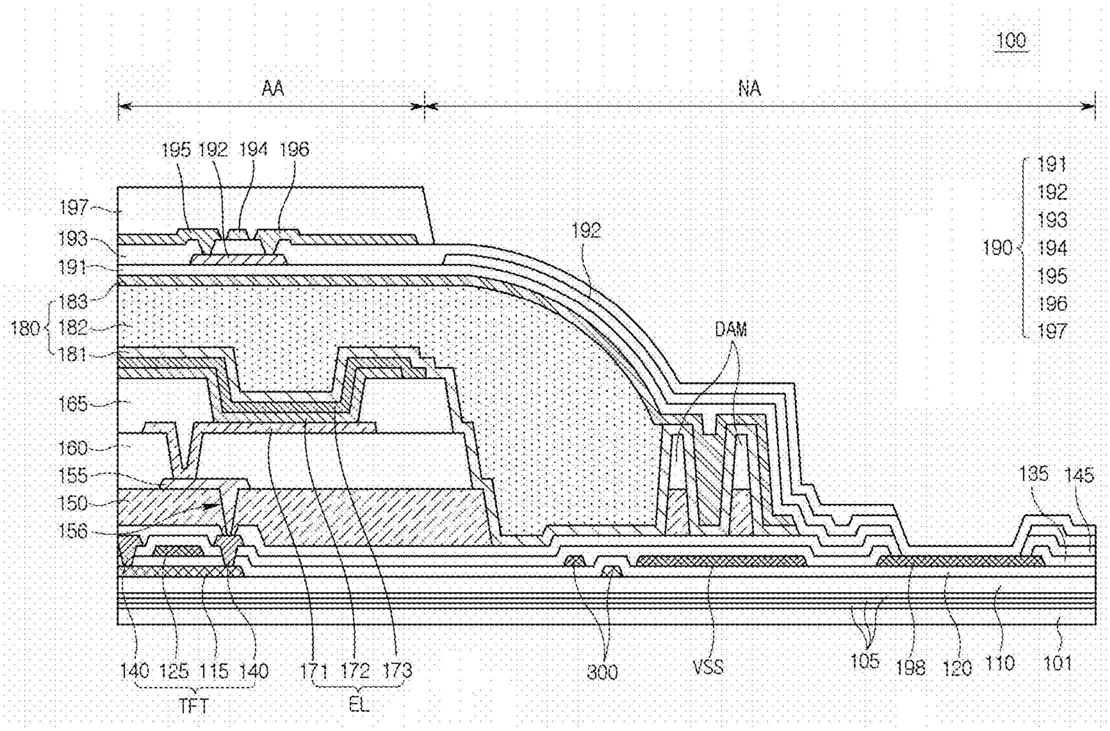
FIG. 2 is a cross sectional view showing a stacking type of the display device according to the example embodiment of the present disclosure.

FIG. 2 is a cross sectional view showing a stacking type of the display device according to the example embodiment of the present disclosure.

Referring to FIG. 2, the display panel 100 includes a display area AA (see FIG. 2) and a non-display area NA (see FIG. 2). The pixels P are located in the display area AA. The non-display area NA is disposed to be adjacent to the display area AA or to surround the display area AA. The gate driver 300 and the data driver 400 are disposed in the non-display area NA. But embodiments are not limited thereto. For example, at least one of the gate driver 300 and the data driver 400 may be disposed separately from the display panel 100 and connected to the display panel 100. Alternatively, at least a part of at least one of the gate driver 300 and the data driver 400 may be disposed in the display area AA.

In the display panel 100, a plurality of gate lines GL and a plurality of data lines DL cross each other, and each of the plurality of pixels P is connected to the gate line GL and the data line DL. Specifically, one pixel P receives the gate signal from the gate driver 300 through the gate line GL, receives the data signal from the data driver 400 through the data line DL, and receives a high potential driving voltage EVDD and a low potential driving voltage EVSS from the power supply 500.

Here, the gate line GL provides a scan signal SC and/or an emission control signal EM, and the data line DL provides a data voltage Vdata. Also, according to various embodiments, the gate line GL may include a plurality of scan lines SCL for providing the scan signal SC and/or an emission control signal line EML for providing the emission control signal EM. In addition, the plurality of pixels P may additionally include a power line VL and may receive a bias voltage Vobs and an initialization voltages Var and Vini.

Also, each of the pixels P may include, as shown in FIG. 2, a light emitting element EL and a pixel circuit that controls the driving of the light emitting element EL. Here, the light emitting element EL may include an anode electrode 171, a cathode electrode 173, and a light emitting layer 172 between the anode electrode 171 and the cathode electrode 173.

The pixel circuit may include a switching element, a driving element, and/or a capacitor. Here, the switching element and the driving element may be composed of thin film transistors. In the pixel circuit, the driving element controls the amount of light emission of the light emitting element EL by controlling the amount of current supplied to the light emitting element EL in accordance with the data voltage. Also, the switching element operates the pixel circuit by receiving the scan signal SC supplied through the plurality of scan lines SCL and/or the emission control signal EM supplied through the emission control line EML.

The display panel 100 may be implemented as a non-transmissive display panel or a transmissive display panel. The transmissive display panel may be applied to a transparent display device in which an image is displayed on a screen and a real object in the background is visible. The display panel 100 may be manufactured as a flexible display panel in which the pixels P are disposed on a flexible substrate such as a plastic substrate, a metal substrate, or the like, or a rigid display panel. For example, the flexible display panel may be implemented by a panel (e.g., an OLED panel) using a plastic substrate. In a flexible display, the size and shape of the screen may be varied by a method of rolling, folding, and bending the flexible display panel.

Each of the pixels P may be divided into a red pixel, a green pixel, and a blue pixel for color implementation. Alternatively, each of the pixels P may further include a white pixel. Each of the pixels P includes a pixel circuit. The colors of the pixels P are not limited thereto. For example, the pixels P may also be divided into a magenta pixel, yellow pixel and cyan pixel, or other combination of colors.

As an example, touch sensors may be disposed on the display panel 100. A touch input may be sensed by using separate touch sensors or may be sensed through the pixels P. The touch sensors may be implemented as on-cell type or add-on type touch sensors disposed on the screen of the display panel 100 or as in-cell type touch sensors which are embedded in the display panel 100.

The controller 200 processes image data RGB input from the outside appropriately for the size and resolution of the display panel 100 and supplies the processed image data to the data driver 400. The controller 200 generates a gate control signal GCS and a data control signal DCS by using synchronization signals (e.g., input from the outside), for example, a dot clock signal CLK, a data enable signal DE, a horizontal synchronization signal Hsync, and a vertical synchronization signal Vsync. The generated gate control signal GCS and data control signal DCS are provided to the gate driver 300 and the data driver 400 respectively, so that the gate driver 300 and the data driver 400 are controlled.

The controller 200 may be configured by being coupled to various processors, for example, a microprocessor, a mobile processor, an application processor, etc., depending on a device to be mounted thereon.

A host system, for example, may be any one of a television (TV) system, a set top box, a navigation system, a personal computer (PC), a home theater system, a mobile device, a wearable device, and a vehicle system, etc. However, embodiments of the present disclosure are not limited to these examples.

The controller 200 may multiply an input frame frequency by "i" and may control the operation timing of a display panel driver at a frame frequency of input frame frequency× "i" ("i" is a positive integer greater than 0) Hz. The input frame frequency is 60 Hz in National Television Standards Committee (NTSC) method and is 50 Hz in Phase-Alternating Line (PAL) method. But embodiments are not limited thereto. The input frame frequency may be a frame frequency other than 50 Hz or 60 Hz.

The controller 200 generates a signal such that the pixel P can be driven at various refresh rates. That is, the controller 200 generates signals related to the driving such that the pixel P is driven in a variable refresh rate (VRR) mode or in a switchable manner between a first refresh rate and a second refresh rate. For example, the controller 200 can drive the pixel P at various refresh rates by simply changing the speed of a clock signal, by generating a synchronization signal and creating a horizontal blank or a vertical blank, or by driving the gate driver 300 in a mask manner.

The controller 200 generates the gate control signal GCS for controlling the operation timing of the gate driver 300 and the data control signal DCS for controlling the operation timing of the data driver 400, on the basis of the timing signals Vsync, Hsync, CLK and DE received from the host system. The controller 200 synchronizes the gate driver 300 and the data driver 400 by controlling the operation timing of the display panel driver.

A voltage level of the gate control signal GCS output from the controller 200 may be converted into gate-on voltages VGL and/or VEL and gate-off voltages VGH and/or VEH through a level shifter (not shown), and be supplied to the gate driver 300. The level shifter converts a low-level voltage of the gate control signal GCS into the gate low voltage VGL and converts a high-level voltage of the gate control signal GCS into the gate high voltage VGH. The gate control signal GCS may at least include a start pulse and a shift clock, a reset signal, an initialization signal, and the like.

The gate driver 300 provides a scan signal SC to the gate line GL in accordance with the gate control signal GCS provided from the controller 200. The gate driver 300 may be disposed on one side or both sides of the display panel 100 in a Gate-In-Panel (GIP) manner. But embodiments are not limited thereto. As an example, the gate driver 300 may be implemented by a chip-on-film COF method in which an element is mounted on a film connected to the display panel 100.

The gate driver 300 sequentially outputs the gate signal to the plurality of gate lines GL under the control of the controller 200. The gate driver 300 may sequentially provide the gate signals to the gate lines GL by shifting the gate signals by using a shift register.

The gate signal may include an emission control signal EM and/or the scan signal SC in an organic light emitting display device. The scan signal SC includes a scan pulse which swings between the gate-on voltage VGL and the gate-off voltage VGH. The emission control signal EM may include an emission control signal pulse which swings between the gate-on voltage VEL and the gate-off voltage VEH.

The scan pulse is synchronized with the data voltage Vdata and selects the pixels P of a line where data is to be written. The emission control signal EM defines an emission time of the pixels P.

The gate driver 300 may include an emission control signal driver 310 and/or at least one scan driver 320.

The emission control signal driver 310 outputs the emission control signal pulse in response to the start pulse and the shift clock from the controller 200 and sequentially shifts the emission control signal pulses in accordance with the shift clock.

The at least one scan driver 320 outputs the scan pulse in response to the start pulse and the shift clock from the controller 200 and shifts the scan pulse in accordance with a shift clock timing.

The data driver 400 converts the image data RGB into the data voltage Vdata in accordance with the data control signal DCS provided from the controller 200, and provides the converted data voltage Vdata to the pixel P through the data line DL according to the timing at which the scan signal is applied through the gate lines GL.

Although the data driver 400 is shown as being disposed on one side of the display panel 100 in one form in FIG. 1, the number and position of the data driver 400 are not limited thereto.

For example, the data driver 400 may be composed of a plurality of integrated circuits (ICs) and may disposed on one side of the display panel 100 as being divided into a plurality of pieces. In addition, the data driver 400 can be connected to a bonding pad of the display panel 100 by a tape automated bonding TAB method or a chip-on-glass COG method. Alternatively, the data driver 400 can be directly disposed on the display panel 100. Alternatively, the data driver 400 can be integrated and arranged on the display panel 100. Alternatively, the data driver 400 can be implemented by a chip-on-film COF method. In this case, the data driver 400 can be mounted on a film connected to the display panel 100, and can be electrically connected to the display panel 100 through wires on the film.

The power supply 500 generates DC power required for driving a pixel array of the display panel 100 and the display panel driver by using a DC-DC converter. The DC-DC converter may include a charge pump, a regulator, a buck converter, a boost converter, a programmable gamma integrated circuit (P-GMA IC), and the like. The power supply 500 receives a DC input voltage applied from the unshown host system and may generate the gate-on voltages VGL and VEL, the gate-off voltages VGH and VEH, the high potential driving voltage EVDD, the low potential driving voltage EVSS, etc. The gate-on voltages VGL and VEL and the gate-off voltages VGH and VEH are supplied to the level shifter (not shown) and the gate driver 300. One or more of the high potential driving voltage EVDD and the low potential driving voltage EVSS, the initialization voltage Vini, and the reference voltage Vref are (e.g., commonly or dividedly) supplied to the pixels P. The high potential driving voltage EVDD may be set to a voltage higher than the low potential driving voltage EVSS, the initialization voltage Vini, and the reference voltage Vref.

FIG. 2 is a cross sectional view showing a stacking type of the display device according to the example embodiment of the present disclosure.

Referring to FIG. 2, a thin film transistor TFT for driving the light emitting element EL may be disposed in the display area AA on a substrate 101. The thin film transistor TFT may include a semiconductor layer 115, a gate electrode 125, and source and drain electrodes 140, and a second gate insulating layer 120 between the gate electrode 125 and the semiconductor layer 115. The thin film transistor TFT may be a driving transistor DT (see FIG. 4). For convenience of description, only the driving transistor DT among various thin film transistors that can be included in the display device 10 is shown. However, other thin film transistors such as a switching transistor, etc., can also be included in the display device 10. In addition, although it has been described in the present disclosure that the thin film transistor TFT has a coplanar structure, the thin film transistor may be implemented to have another structure such as a staggered structure, and is not limited thereto.

The driving transistor DT receives the high potential driving voltage EVDD in response to the data signal supplied to the gate electrode 125 of the driving transistor DT and controls a current supplied to the light emitting element EL, thereby controlling the amount of light emission of the light emitting element EL. The driving transistor DT may supply a constant current until a data signal of the next frame is supplied by a voltage charged in a storage capacitor (not shown), so that the light emitting element EL can maintain light emission. A high-potential supply line may be formed in parallel to the data line.

As shown in FIG. 2, the thin film transistor TFT may include the semiconductor layer 115 disposed on the substrate 101 (e.g., on a first insulating layer 110 on the substrate 101), the gate electrode 125 that overlaps the semiconductor layer 115 with a second insulating layer 120 interposed therebetween, and the source and drain electrodes 140 which are disposed on a third insulating layer 135 and come into contact with the semiconductor layer 115.

The semiconductor layer 115 may be an area where a channel is formed when the thin film transistor TFT is driven. The semiconductor layer 115 may be a polycrystalline semiconductor. The polycrystalline semiconductor may be formed of a low temperature poly silicon (LTPS) having a high mobility, but is not limited thereto. For example, the semiconductor layer 115 may be formed of an oxide semiconductor or includes the oxide semiconductor, but is not limited thereto. Alternatively, the semiconductor layer 115 may be formed of various inorganic or organic semiconductors such as amorphous silicon (a-Si), polycrystalline silicon (poly-Si), or pentacene, etc., but is not limited thereto. When the semiconductor layer 115 is formed of an oxide semiconductor or includes an oxide semiconductor, it has an excellent effect to block the leakage current so that the luminance variation of the sub pixel may be reduced or minimized.

The semiconductor layer 115 may be formed on the first insulating layer 110. The semiconductor layer 115 may include a channel region, a source region, and a drain region. The channel region may overlap with the gate electrode 125 with the second insulating layer 120 therebetween and may be formed between the source and drain electrodes 140. The source region is electrically connected to the source electrode 140 through a contact hole that passes through the second insulating layer 120 and the third insulating layer 135. The drain region may be electrically connected to the drain electrode 140 through a contact hole that passes through the second insulating layer 120 and the third insulating layer 135. The first insulating layer 110 and/or a buffer layer 105 may be optionally disposed between the semiconductor layer 115 and the substrate 101. The buffer layer 105 can reduce the permeation of moisture and/or oxygen that has penetrated the substrate 101, may be formed by a single layer or multiple layers, for example, buffer layer 105 may include a-Si, silicon nitride (SiNx), or silicon oxide (SiOx), but is not limited thereto. But embodiments are not limited thereto. For example, the buffer layer 105 may be formed of a plurality of layers of the same or different materials. The buffer layer 105 may be omitted depending on the type and material of the substrate 101, the structure and type of the thin-film transistor, and the like.

The first insulating layer 110 protects the semiconductor layer 115 and can block various types of defects introduced from the substrate 101.

The buffer layer 105 may be comprised of at least one layer. The uppermost layer of the buffer layer 105 in contact with the first insulating layer 110 may be made of a material having different etching characteristics from those of the first insulating layer 110, the second insulating layer 120, the third insulating layer 135, and the other layers of the buffer layer 105. The uppermost layer of the buffer layer 105 in contact with the first insulating layer 110 may be made of any one of silicon nitride (SiNx) and silicon oxide (SiOx). The first insulating layer 110, the second insulating layer 120, the third insulating layer 135, and the other layers of the buffer layer 105 may be made of the other one of silicon nitride (SiNx) and silicon oxide (SiOx). For example, the uppermost layer of the buffer layer 105 in contact with the first insulating layer 110 may be made of silicon nitride (SiNx), and the first insulating layer 110, the second insulating layer 120, the third insulating layer 135, and the other layers of the buffer layer 105 may be made of silicon oxide (SiOx), but are not limited thereto. Other materials for the buffer layer 105, the first insulating layer 110, the second insulating layer 120, and the third insulating layer 135 are possible.

The gate electrode 125 is formed on the second insulating layer 120 and may overlap with the channel region of the semiconductor layer 115 with the second insulating layer 120 interposed therebetween. The gate electrode 125 may be formed of a first conductive material forming a single-layer or a multi-layer made of any one or more of magnesium (Mg), molybdenum (Mo), aluminum (Al), chromium (Cr), gold (Au), titanium (Ti), nickel (Ni), neodymium (Nd), and copper (Cu) or an alloy thereof. However, the materials of gate electrode is not limited thereto. For example, the gate electrode 125 may also be formed a single-layer or a multi-layer made of other conductive materials, for example, a transparent conductive oxide such as indium tin oxide (ITO) or indium zinc oxide (IZO), etc.

The source electrode 140 may be connected to the exposed source region of the semiconductor layer 115 through the contact hole that passes through the second insulating layer 120 and the third insulating layer 135. The drain electrode 140 faces the source electrode 140 and may be connected to the drain region of the semiconductor layer 115 through the contact hole that passes through the second insulating layer 120 and the third insulating layer 135. These source and drain electrodes 140 may be formed of a second conductive material, which may be a single-layer or a multi-layer made of any one or more elements such as of magnesium (Mg), molybdenum (Mo), aluminum (Al), chromium (Cr), gold (Au), titanium (Ti), nickel (Ni), neodymium (Nd), and copper (Cu) or an alloy of containing two or more thereof. However, the source and drain electrodes are not limited thereto. For example, these source and drain electrodes 140 may also be formed a single-layer or a multi-layer made of other conductive materials.

A connection electrode 155 may be disposed between a first intermediate layer 150 and a second intermediate layer 160. The connection electrode 155 may be exposed through a connection electrode contact hole 156 that passes through a protective layer 145 and the first intermediate layer 150 and may be connected to the drain electrode 140. The connection electrode 155 may be made of the same or similar material (e.g., a material having a low resistivity) as the drain electrode 140, for example, the connection electrode 155 may be configured by a conductive material, such as copper (Cu), aluminum (Al), molybdenum (Mo), nickel (Ni), titanium (Ti), chrome (Cr), or an alloy thereof. However, the connection electrode is not limited thereto. The connection electrode 155 may be omitted. In this case, an anode electrode 171 of the light emitting element EL may directly be connected to the drain electrode 140.

Referring to FIG. 2, the light emitting element EL including the light emitting layer 172 may be disposed on the second intermediate layer 160 and a bank layer 165. The light emitting element EL may include the anode electrode 171, at least one light emitting layer 172 formed on the anode electrode 171, and a cathode electrode 173 formed on the light emitting layer 172.

The anode electrode 171 may be disposed on the first intermediate layer 150 through a contact hole that passes through the second intermediate layer 160 and may be electrically connected to the connection electrode 155 exposed to the top of the second intermediate layer 160.

The anode electrode 171 of each pixel is formed to be exposed by the bank layer 165. The bank layer 165 may be formed of an opaque material (e.g., black) in order to prevent or reduce optical interference between adjacent pixels. In this case, the bank layer 165 may include a light-shielding material made of at least one of a color pigment, an organic black pigment, and a carbon pigment, but is not limited thereto.

Referring to FIG. 2, at least one light emitting layer 172 may be formed on the anode electrode 171 of a light emitting area provided by the bank layer 165. At least one light emitting layer 172 may include at least one of various layers, such as a hole transport layer, a hole injection layer, a hole blocking layer, the light emitting layer 172, an electron injection layer, an electron blocking layer, and an electron transport layer on the anode electrode 171. The light emitting layer 172 may be formed by stacking them in a sequential order or in a reverse order in accordance with a light emission direction. The hole transport layer, the hole injection layer, the hole blocking layer, the electron injection layer, the electron blocking layer, and the electron transport layer may be common layers commonly formed in the plurality of sub pixels. In addition, the light emitting layer 172 may include first and second light emitting stacks facing each other with a charge generation layer interposed therebetween, the charge generating layer may have a PN junction structure and may include an N-type charge generating layer and a P-type charge generating layer. In this case, the light emitting layer 172 of one of the first and second light emitting stacks generates blue light, and the other light emitting layer 172 of the other of the first and second light emitting stacks generates yellow-green light. Accordingly, white light can be generated through the first and second light emitting stacks. Embodiments are not limited thereto. For example, a light of a color other than white can be generated through the first and second light emitting stacks or more stacks, depending on the purpose of the display device. Since the white light generated from the light emitting stack is incident on a color filter located above or below the light emitting layer 172, a color image can be implemented. As another example, the color image can be implemented by generating color light corresponding to each pixel in each light emitting layer 172 without a separate color filter. For example, the light emitting layer 172 of the red pixel may generate red light, the light emitting layer 172 of the green pixel may generate green light, and the light emitting layer 172 of the blue pixel may generate blue light.

Referring to FIG. 2, the cathode electrode 173 is formed to face the anode electrode 171 with the light emitting layer 172 interposed therebetween. As an example, the cathode electrode 173 may receive the high potential driving voltage EVDD.

An encapsulation layer 180 may reduce or prevent external moisture or oxygen from penetrating the light emitting element EL that is vulnerable to the external moisture or oxygen. To this end, the encapsulation layer 180 may include an inorganic encapsulation layer composed of at least one layer and/or an organic encapsulation layer composed of at least one layer, but is not limited thereto. In the present disclosure, the structure of the encapsulation layer 180 in which a first encapsulation layer 181, a second encapsulation layer 182, and a third encapsulation layer 183 are sequentially stacked will be taken as an example.

The first encapsulation layer 181 is formed on the substrate 101 on which the cathode electrode 173 is formed to suppress the permeation of the moisture or oxygen. The third encapsulation layer 183 is formed on the substrate 101 on which the second encapsulation layer 182 is formed, and may be formed to surround the top, bottom and side surfaces of the second encapsulation layer 182, together with the first encapsulation layer 181. The first encapsulation layer 181 and the third encapsulation layer 183 can reduce, minimize or prevent the penetration of external moisture or oxygen into the light emitting element EL. The first encapsulation layer 181 and the third encapsulation layer 183 may be made of an inorganic insulating material that can be deposited at low temperature such as silicon nitride (SiNx), silicon oxide (SiOx), silicon oxynitride (SiNxOy), or aluminum oxide ($Al_xO_y$), but is not limited thereto. Since the first encapsulation layer 181 and the third encapsulation layer 183 are deposited in a low-temperature atmosphere, it is possible to reduce or prevent the light emitting element EL vulnerable to a high-temperature atmosphere from being damaged during the deposition process of the first encapsulation layer 181 and the third encapsulation layer 183.

The second encapsulation layer 182 may serve as a buffer which reduces or minimize stress between the respective layers due to, for example, bending of the display device 10 and may flatten a step difference between the respective layers. The second encapsulation layer 182 is formed of non-photosensitive organic insulating materials such as an acrylic resin, an epoxy resin, a phenolic resin, a polyamide resin, a polyimide resin, and polyethylene or silicon oxycarbon (SiOxCy) or photosensitive organic insulating material such as photoacrylic on the substrate 101 on which the first encapsulation layer 181 is formed, but not limited thereto. When the second encapsulation layer 182 is formed by an inkjet method, a dam DAM may be disposed in order to prevent the liquid second encapsulation layer 182 from diffusing to the edge of the substrate 101. The dam DAM may be disposed closer to the edge of the substrate 101 than the second encapsulation layer 182. Due to the dam DAM, it is possible to reduce or prevent the diffusion of the second encapsulation layer 182 into a pad area where a conductive pad, located at the outermost edge of the substrate 101 is disposed.

The dam DAM is designed to prevent the diffusion of the second encapsulation layer 182. However, when the second encapsulation layer 182 is formed to exceed the height of the dam DAM during the process, the second encapsulation layer 182 that is an organic layer may be exposed to the outside. Therefore, this may make it easier for moisture or the like to penetrate the light emitting element. Accordingly, as an example, in order to reduce or prevent this limitation, at least ten dams DAM may be formed repeatedly. The embodiments are not limited thereto. As an example, less that ten dams DAM may be formed. As another example, one dam DAM may be formed or even be omitted.

Referring to FIG. 2, the dam DAM may be disposed on the protective layer 145 of the non-display area NA.

Also, the dam DAM may be formed simultaneously with at least one of the first intermediate layer 150 and the second intermediate layer 160. The lower layer of the dam DAM may be formed together with the formation of the first intermediate layer 150. The upper layer of the dam DAM may be formed together with the formation of the second intermediate layer 160. Therefore, the dam DAM may be formed in a double stacked structure. But embodiments are not limited thereto. As an example, the dam DAM may be formed separately from the first intermediate layer 150 and the second intermediate layer 160, and may be formed in a single layer structure or a stacked structure of more than one layer.

Accordingly, the dam DAM may be made of the same material as the first intermediate layer 150 and the second intermediate layer 160, but is not limited thereto.

Referring to FIG. 2, the dam DAM may be formed to overlap a low potential driving power line VSS. For example, in the non-display area NA, the low potential driving power line VSS may be formed in a layer under an area where the dam DAM is located.

The low potential driving power line VSS and gate driver 300 configured in the form of a Gate-In-Panel (GIP) is formed in a shape at least partially surrounding the outer portion of the display panel. The low potential driving power supply line VSS may be positioned further outward than the gate driver 300. In addition, the low potential driving power line VSS may be connected to the anode electrode 171 and apply a common voltage. But embodiments are not limited thereto. As an example, the low potential driving power supply line VSS may be located more inside than the gate driver 300. The gate driver 300 is simply shown in plan and cross-sectional views, but may be configured by using a thin film transistor TFT having the same structure as that of the thin film transistor TFT of the display area AA.

Referring to FIG. 2, the low potential driving power line VSS is positioned further outward than the gate driver 300. The low potential driving power line VSS is disposed more outside than the gate driver 300 and at least partially surrounds the display area AA. The low potential driving power line VSS may be made of the same material as those of the source and drain electrodes 140 of the thin film transistor TFT, but is not limited thereto. For example, the low potential driving power line VSS may be made of the same material as that of the gate electrode 125.

Also, the low potential driving power line VSS may be electrically connected to the anode electrode 171. The low potential driving power line VSS may supply the low potential driving voltage EVSS to the plurality of pixels in the display area AA.

A touch layer 190 may be optionally disposed on the encapsulation layer 180. A touch buffer layer 191 of the touch layer 190 may be located between touch sensor metal and the cathode electrode 173 of the light emitting element EL. The touch sensor metal includes touch electrode connection lines 192 and 194 and touch electrodes 195 and 196.

The touch buffer layer 191 can reduce or prevent a chemical solution (developing solution or etching solution, etc.) used in the manufacturing process of the touch sensor metal which is disposed on the touch buffer layer 191 or moisture from the outside, etc., from penetrating into the light emitting layer 172 (e.g., the light emitting layer 172 including organic materials). Accordingly, the touch buffer layer 191 can reduce or prevent damage to the light emitting layer 172 which is vulnerable to chemical solutions or moisture.

The touch buffer layer 191 is formed of a material (e.g., an organic material) which can be formed at a certain temperature (e.g., 100° C. or less) and has a low dielectric constant of 1 to 3 in order to reduce or prevent damage to the light emitting layer 172 including materials (e.g., organic materials) vulnerable to high temperatures. For example, the touch buffer layer 191 may be formed of an acryl-based, epoxy-based, or siloxane-based material. The touch buffer layer 191 which is formed of an organic insulating material and has a flattening performance can reduce or prevent the encapsulation layer 180 from being damaged (for example, due to bending of the organic light emitting display device) and reduce or prevent the touch sensor metal formed on the touch buffer layer 191 from being broken.

According to a mutual-capacitance-based touch sensor structure, the touch electrodes 195 and 196 may be disposed on the touch buffer layer 191, and the touch electrodes 195 and 196 may be disposed to cross each other.

The touch electrode connection lines 192 and 194 may electrically connect the touch electrodes 195 to each other or electrically connect the touch electrodes 196 to each other. The touch electrode connection lines 192 and 194 and the touch electrodes 195 and 196 may be positioned in different layers with a touch insulating layer 193 interposed therebetween.

As an example, the touch electrode connection lines 192 and 194 may be arranged to overlap the bank layer 165, so that an aperture ratio may be prevented from being reduced. But embodiments are not limited thereto. As an example, the touch electrode connection lines 192 and 194 may be arranged to overlap the light emitting area.

Meanwhile, in the touch electrodes 195 and 196, a portion of the touch electrodes 195 and/or 196 or a portion of the touch electrode connection line 192 may pass through the top and side surface of the encapsulation layer 180 and the top and side surface of the dam DAM and may be electrically connected to a touch driving circuit (not shown) through a touch pad 198.

The portion of the touch electrodes 195 and/or 196 or the portion of the touch electrode connection line 192 may receive a touch driving signal from the touch driving circuit and may transmit the touch driving signal to the touch electrodes 195 and/or 196, and may transfer a touch sensing signal from the touch electrodes 195 and 196 to the touch driving circuit.

A touch protective layer 197 may be disposed on the touch electrodes 195 and 196. In the drawing, the touch protective layer 197 is shown as being disposed only on the touch electrodes 195 and 196, but is not limited thereto. The touch protective layer 197 may extend to the front and rear of the dam DAM and be disposed on the touch electrode connection lines 192.

Also, a color filter (not shown) may be optionally further disposed on the encapsulation layer 180. The color filter may be positioned on the touch layer 190 or between the encapsulation layer 180 and the touch layer 190.

Figure 3:
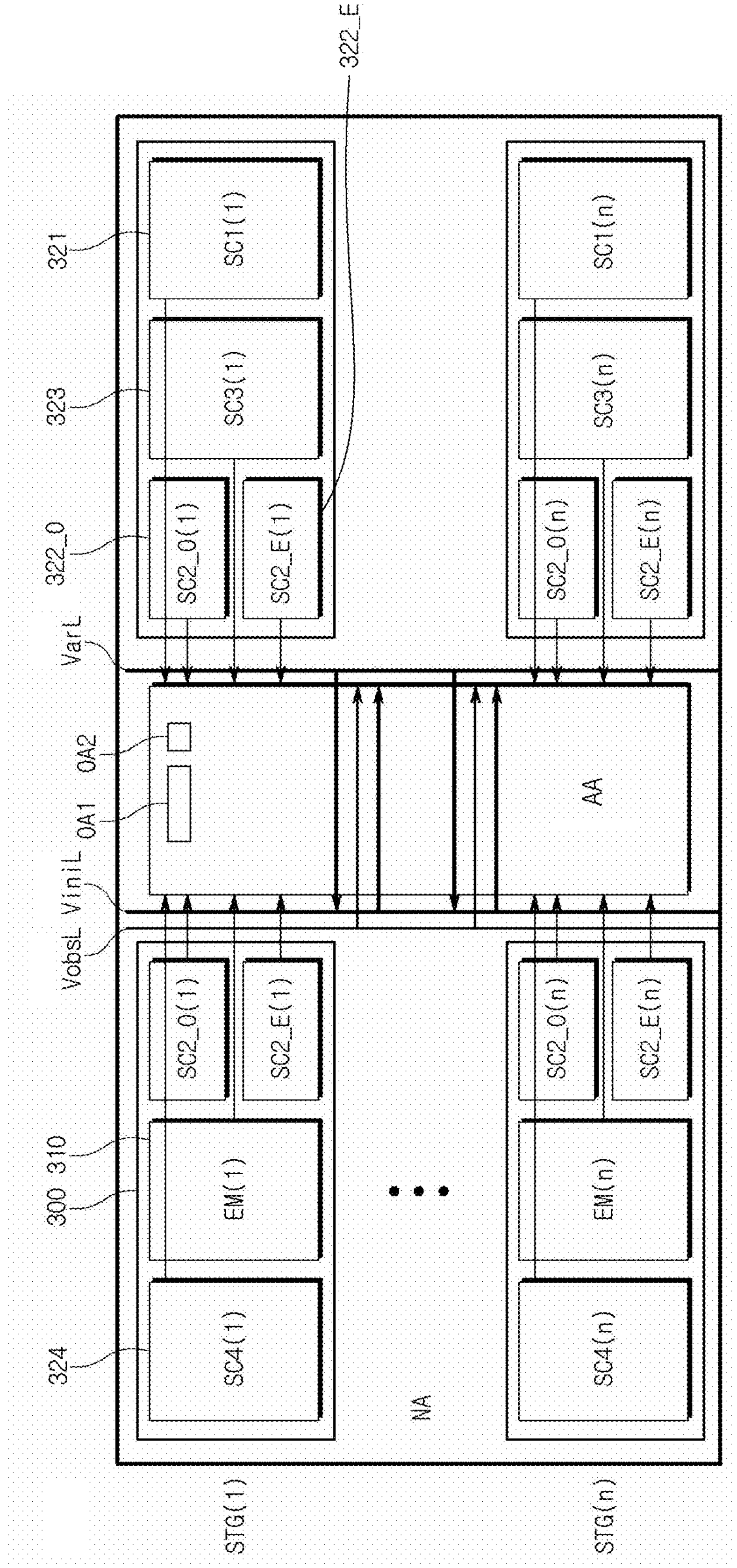
FIG. 3 is a view showing a configuration of a gate driver in the display device according to the example embodiment of the present disclosure.

FIG. 3 is a view showing a configuration of the gate driver in the display device according to the example embodiment of the present disclosure.

Referring to FIG. 3, the gate driver 300 includes the emission control signal driver 310 and the scan driver 320. The scan driver 320 may include first to fourth scan drivers 321, 322, 323, and 324. Also, the second scan driver 322 may include a second odd-numbered scan driver 322_O and a second even-numbered scan driver 322_E.

In the gate driver 300, the shift register may be configured symmetrically on both sides of the display area AA. Also, in the gate driver 300, the shift register on one side of the display area AA may include the second scan drivers 322_O and 322_E, the fourth scan driver 324, and the emission control signal driver 310, respectively. The shift register on the other side of the display area AA may include the first scan driver 321, the second scan drivers 322_O and 322_E, and the third scan driver 323, respectively. However, there is no limit to this. The emission control signal driver 310 and the first to fourth scan drivers 321, 322, 323, and 324 may be disposed differently according to the embodiment.

Each of stages STG1 to STGn of the shift register may include first scan signal generators SC1(1) to SC1(n), second scan signal generators SC2_O(1) to SC2_O(n) and SC2_E(1) to SC2_E(n), third scan signal generators SC3(1) to SC3(n), fourth scan signal generators SC4(1) to SC4(n), and emission control signal generators EM(1) to EM(n).

The first scan signal generators SC1(1) to SC1(n) output first scan signals SC1(1) to SC1(n) through first scan lines SCL1 of the display panel 100. The second scan signal generators SC2_O(1) to SC2_O(n) and SC2_E(1) to SC2_E (n) output second scan signals SC2(1) to SC2(n) through second scan lines SCL2 of the display panel 100. The third scan signal generators SC3(1) to SC3(n) output third scan signals SC3(1) to SC3(n) through third scan lines SCL3 of the display panel 100. The fourth scan signal generators SC4(1) to SC4(n) output fourth scan signals SC4(1) to SC4(n) through fourth scan lines SCL4 of the display panel 100. The emission control signal generators EM(1) to EM(n) output the emission control signals EM(1) to EM(n) through the emission control lines EML of the display panel 100, but the embodiments of the present disclosure are not limited thereto.

The first scan signals SC1(1) to SC1(n) may be used as a signal for driving an A-th transistor (e.g., a compensation transistor, etc.) included in the pixel circuit. The second scan signals SC2_O(1) to SC2_O(n) and SC2_E(1) to SC2_E(n) may be used as a signal for driving a B-th transistor (e.g., a data supply transistor, etc.) included in the pixel circuit. The third scan signals SC3(1) to SC3(n) may be used as a signal for driving a C-th transistor (e.g., a bias transistor, etc.) included in the pixel circuit. The fourth scan signals SC4(1) to SC4(n) may be used as a signal for driving a D-th transistor (e.g., an initialization transistor, etc.) included in the pixel circuit. The emission control signals EM(1) to EM(n) may be used as a signal for driving an E-th transistor (e.g., a light emission control transistor, etc.) included in the pixel circuit. For example, when the light emission control transistors of the pixels are controlled by using the emission control signals EM(1) to EM(n), an emission time of the light emitting element may be varied.

Referring to FIG. 3, a bias voltage bus line VobsL, a first initialization voltage bus line VarL, and a second initialization voltage bus line ViniL may be disposed between the gate driver 300 and the display area AA. In addition, even though the bias voltage bus line VobsL and the second initialization voltage bus line ViniL are shown as being positioned on the left of the display area AA, and the first initialization voltage bus line VarL is shown as being positioned on the right of the display area AA, but the embodiments of the present disclosure are not limited thereto, alternatively, all of bias voltage bus line VobsL, the first initialization voltage bus line VarL, and the second initialization voltage bus line ViniL may be disposed on one side of the display area AA.

The bias voltage bus line VobsL, the first initialization voltage bus line VarL, and the second initialization voltage bus line ViniL may supply a bias voltage Vobs, a first initialization voltage Var, and a second initialization voltage Vini, respectively from the power supply 500 to the pixel circuit.

In the drawing, even though the bias voltage bus line VobsL, the first initialization voltage bus line VarL, and the second initialization voltage bus line ViniL are each shown as being positioned on either the left side such or right side of the display area AA. However, the embodiments of present disclosure are not limited to such an arrangement, as they can also be positioned on both sides. Furthermore, even if they are located on one side, there is no restriction on whether they are positioned on the left or the right side.

Referring to FIG. 3, one or more optical areas OA1 and OA2 may be disposed in the display area AA.

One or more optical areas OA1 and OA2 may be disposed to overlap one or more optical electronics. The optical electronics may include a photographing device such as a camera (an image sensor), a camera flash etc., and a sensor such as a proximity sensor, an illuminance sensor, etc. The one or more optical areas OA1 and OA2 could be omitted as necessary.

For the operation of the optical electronics, the one or more optical areas OA1 and OA2 may have a light-transmission structure and have a transmittance greater than a certain value. As an example, the number of pixels P per unit area in the one or more optical areas OA1 and OA2 may be less than the number of pixels P per unit area in general areas other than the optical areas OA1 and OA2 in the display area AA. As an example, the resolution of the one or more optical areas OA1 and OA2 may be lower than that of the general area in the display area AA.

The light-transmission structure in the one or more optical area OA1 and OA2 may be formed by patterning the cathode electrode in a portion where the pixel P is not arranged. Here, the cathode electrode which is patterned may be removed, for example, by using laser, or the cathode electrode may be selectively formed and patterned by using a material such as a cathode deposition prevention layer or masking process.

Also, light-transmission structure in the one or more optical area OA1 and OA2 may be formed by separating the light emitting element EL and the pixel circuit in the pixel P. As an example, the light emitting element EL of the pixel P is located on the optical areas OA1 and OA2, and a plurality of the transistors TFT constituting the pixel circuit is disposed outside (e.g., around) the optical areas OA1 and OA2, so that the light emitting element EL and the pixel circuit can be electrically connected through a conductive layer such as a transparent metal layer.

Figure 4:
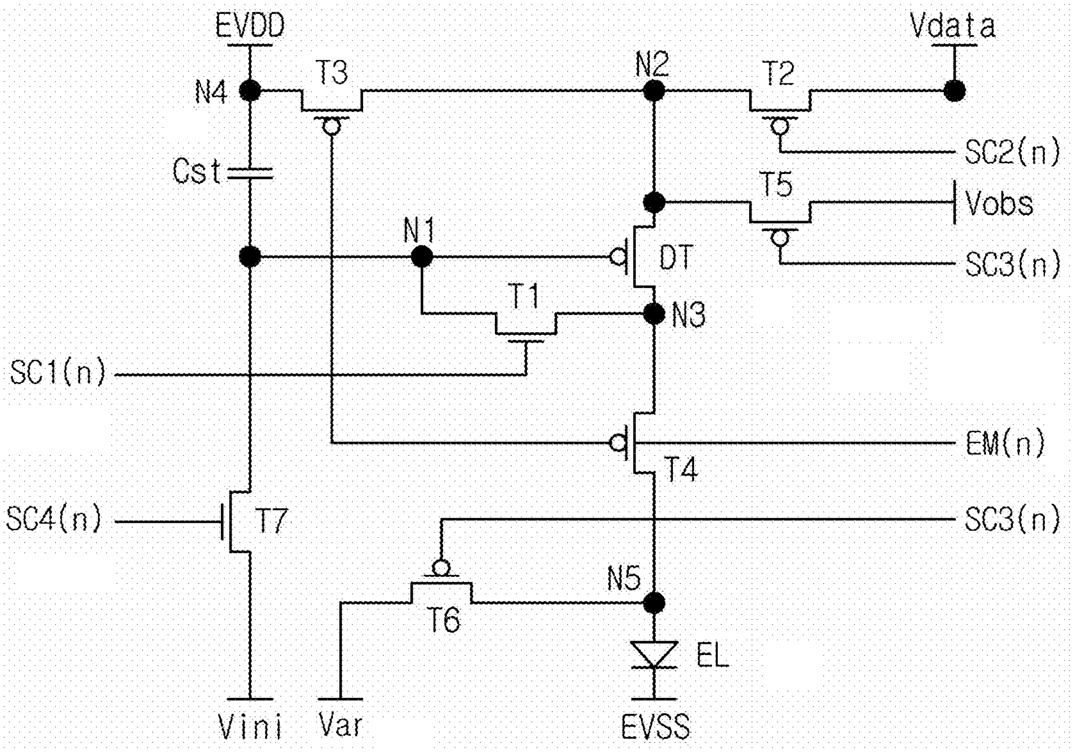
FIG. 4 is a view showing a pixel circuit in the display device according to the example embodiment of the present disclosure.

FIG. 4 is a view showing the pixel circuit in the display device according to the example embodiment of the present disclosure.

FIG. 4 merely shows the pixel circuit as an example for description purposes, and any structure capable of controlling the light emission of the light emitting element EL by applying a light emitting signal EM(n) can be used. For example, the pixel circuit may include an additional scan signal, a switching thin film transistor connected to the scan signal, and a switching thin film transistor to which an additional initialization voltage is applied. Connection relationships among the switching elements or connection positions of the capacitor may be made in various ways. Hereinafter, for convenience of description, the display device having the pixel circuit structure shown in FIG. 4 will be described.

Referring to FIG. 4, each of the plurality of pixels P may include the pixel circuit with the driving transistor DT and include the light emitting element EL connected to the pixel circuit.

The pixel circuit may drive the light emitting element EL by controlling a driving current flowing through the light emitting element EL. The pixel circuit may include the driving transistor DT, first to seventh transistors T1 to T7, and a capacitor Cst. Each of the transistors DT and T1 to T7 may include a first electrode, a second electrode, and a gate electrode. One of the first electrode and the second electrode may be a source electrode, and the other of the first electrode and the second electrode may be a drain electrode.

Each of the transistors DT and T1 to T7 may be a P-type thin film transistor or an N-type thin film transistor. In the embodiment of FIG. 3, a first transistor T1 and a seventh transistor T7 are N-type thin film transistors, and the other transistors DT and T2 to T6 are P-type thin film transistors. However, the transistors are not limited thereto. all or some of the transistors DT and T1 to T7 may be P-type thin film transistors or N-type thin film transistors according to the embodiment. Also, the N-type thin film transistor may be an oxide thin film transistor, and the P-type thin film transistor may be a polycrystalline silicon thin film transistor. But embodiments are not limited thereto. As an example, any of the N-type thin film transistor and the P-type thin film transistor may be any of the oxide thin film transistor, polycrystalline silicon thin film transistor, or thin film transistor of other type.

Hereinafter, an example is shown where the first transistor T1 and the seventh transistor T7 are N-type thin film transistors and the other transistors DT and T2 to T6 are P-type thin film transistors. Accordingly, the first transistor T1 and the seventh transistor T7 are turned on by being applied with a high voltage, and the other transistors DT and T2 to T6 are turned on by being applied with a low voltage.

According to the embodiment, the first transistor T1 constituting the pixel circuit may function as a compensation transistor, the second transistor T2 may function as a data supply transistor, the third and fourth transistors T3 and T4 may function as a light emission control transistor, the fifth transistor T5 may function as a bias transistor, and the sixth and seventh transistors T6 and T7 may function as an initialization transistor.

The light emitting element EL may include the anode electrode and the cathode electrode. The anode electrode of the light emitting element EL may be connected to a fifth node N5, and the cathode electrode may be connected to the low potential driving voltage EVSS.

The driving transistor DT may include a first electrode connected to a second node N2, a second electrode connected to a third node N3, and a gate electrode connected to a first node N1. The driving transistor DT may provide a driving current Id to the light emitting element EL on the basis of a voltage of the first node N1 (or a data voltage stored in the capacitor Cst to be described later).

The first transistor T1 includes the first electrode connected to the first node N1, the second electrode connected to the third node N3, and the gate electrode that receives the first scan signal SC1(n). The first transistor T1 is turned on in response to the first scan signal SC1(n), and allows the driving transistor DT to be diode-connected between the first node N1 and the third node N3, so that a threshold voltage Vth of the driving transistor DT can be sampled. The first transistor T1 may be a compensation transistor.

The capacitor Cst may be connected or formed between the first node N1 and a fourth node N4. The capacitor Cst may store or maintain the provided high potential driving voltage EVDD.

The second transistor T2 may include a first electrode connected to the data line DL (or receiving the data voltage Vdata), a second electrode connected to the second node N2, and a gate electrode that receives the second scan signal SC2(n). The second transistor T2 is turned on in response to the second scan signal SC2(n) and transmits the data voltage Vdata to the second node N2. The second transistor T2 may be a data supply transistor.

The third transistor T3 and the fourth transistor T4 (or first and second light emission control transistors) may be connected between the high potential driving voltage EVDD and the light emitting element EL, and may form a current moving path through which the driving current Id generated by the driving transistor DT moves.

The third transistor T3 includes a first electrode which is connected to the fourth node N4 and receives the high potential driving voltage EVDD, a second electrode connected to the second node N2, and a gate electrode that receives the emission control signal EM(n).

The fourth transistor T4 includes a first electrode connected to the third node N3, a second electrode connected to the fifth node N5 (or the anode electrode of the light emitting element EL), and a gate electrode that receives the emission control signal EM(n).

The third and fourth transistors T3 and T4 are turned on in response to the emission control signal EM(n). In this case, the driving current Id is supplied to the light emitting element EL, and the light emitting element EL may emit light with a luminance corresponding to the driving current Id.

The fifth transistor T5 includes a first electrode that receives the bias voltage Vobs, a second electrode connected to the second node N2, and a gate electrode that receives the third scan signal SC3(n). The fifth transistor T5 may be a bias transistor.

The sixth transistor T6 may include a first electrode that receives the first initialization voltage Var, a second electrode connected to the fifth node N5, and a gate electrode that receives the third scan signal SC3(n).

The sixth transistor T6 may be turned on in response to the third scan signal SC3(n) before the light emitting element EL emits light (or after the light emitting element EL emits light), and may initialize the anode electrode (or pixel electrode) of the light emitting element EL by using the first initialization voltage Var. The light emitting element EL may have a parasitic capacitor formed between the anode electrode and the cathode electrode. Also, while the light emitting element EL emits light, the parasitic capacitor is charged so that the anode electrode of the light emitting element EL may have a specific voltage. Accordingly, the amount of charge accumulated in the light emitting element EL can be initialized by applying the first initialization voltage Var to the anode electrode of the light emitting element EL through the sixth transistor T6.

In the present disclosure, the gate electrodes of the fifth and sixth transistors T5 and T6 are configured to commonly receive the third scan signal SC3(n) and are not necessarily limited thereto. The gate electrodes of the fifth and sixth transistors T5 and T6 may be configured to be independently controlled by receiving separate scan signals.

The seventh transistor T7 may include a first electrode that receives the second initialization voltage Vini, a second electrode connected to the first node N1, and a gate electrode that receives the fourth scan signal SC4(n).

The seventh transistor T7 may be turned on in response to the fourth scan signal SC4(n) and may initialize the gate electrode of the driving transistor DT by using the second initialization voltage Vini. Unnecessary charges may remain on the gate electrode of the driving transistor DT due to the high potential driving voltage EVDD stored in the capacitor Cst. Accordingly, the amount of remaining charge can be initialized by applying the second initialization voltage Vini to the gate electrode of the driving transistor DT through the seventh transistor T7. Although a 8T1C structure is shown in FIG. 4, embodiments of the present disclosure are not limited to this. The structure of the subpixel SP may be selected from among 3T1C, 4T1C, 5T1C, 6T1C, 3T2C, 4T2C, 5T2C, 6T2C, 7T2C, 8T2C and the like structures. And more or less transistors and capacitors could be included.

Figure 5A:
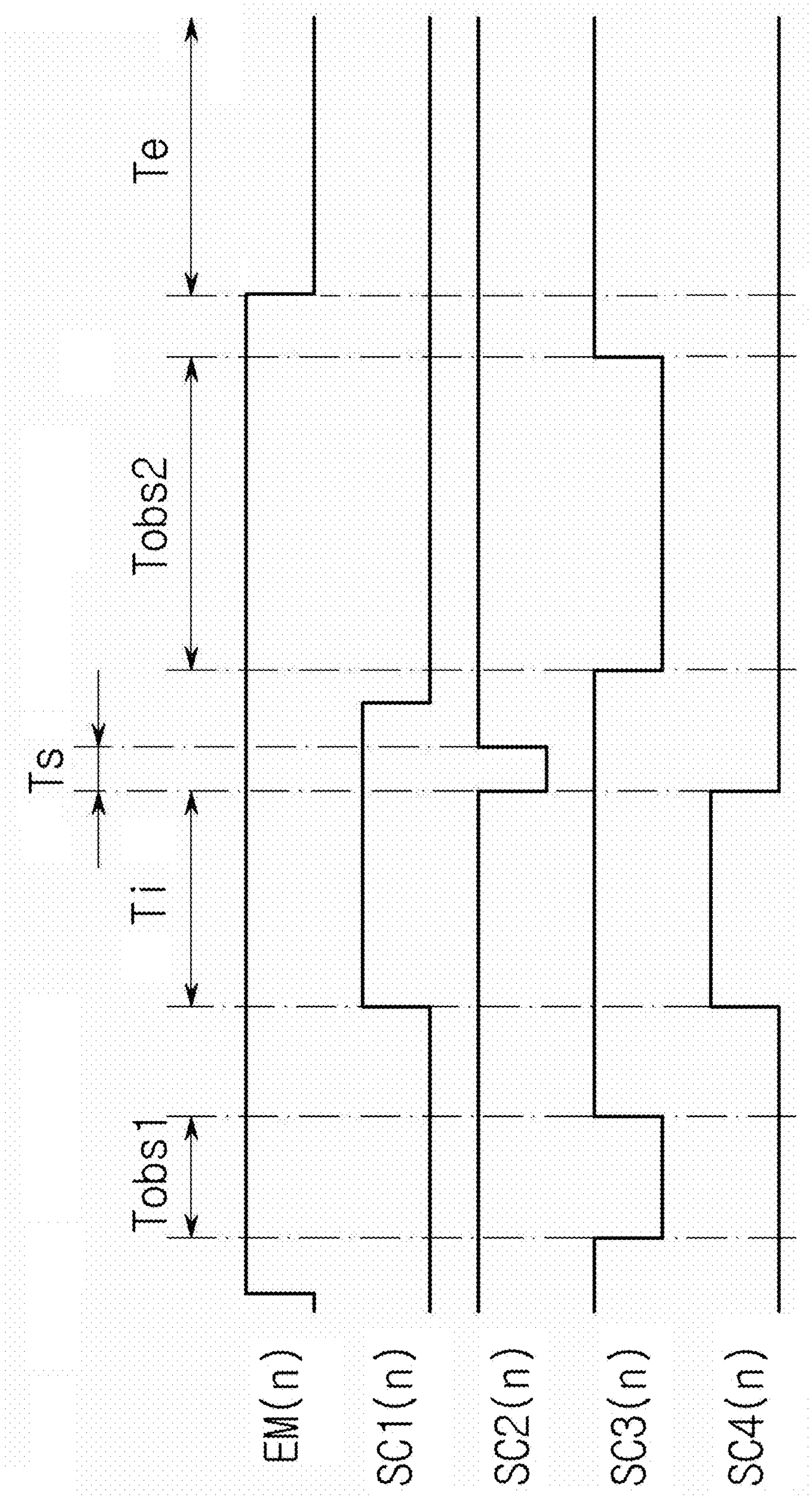
FIGS. 5A to 5C are views for describing operations of a scan signal and an emission control signal in a refresh period and a hold period in the pixel circuit shown in FIG. 4 according to an example embodiment of the present disclosure.
Figure 5B:
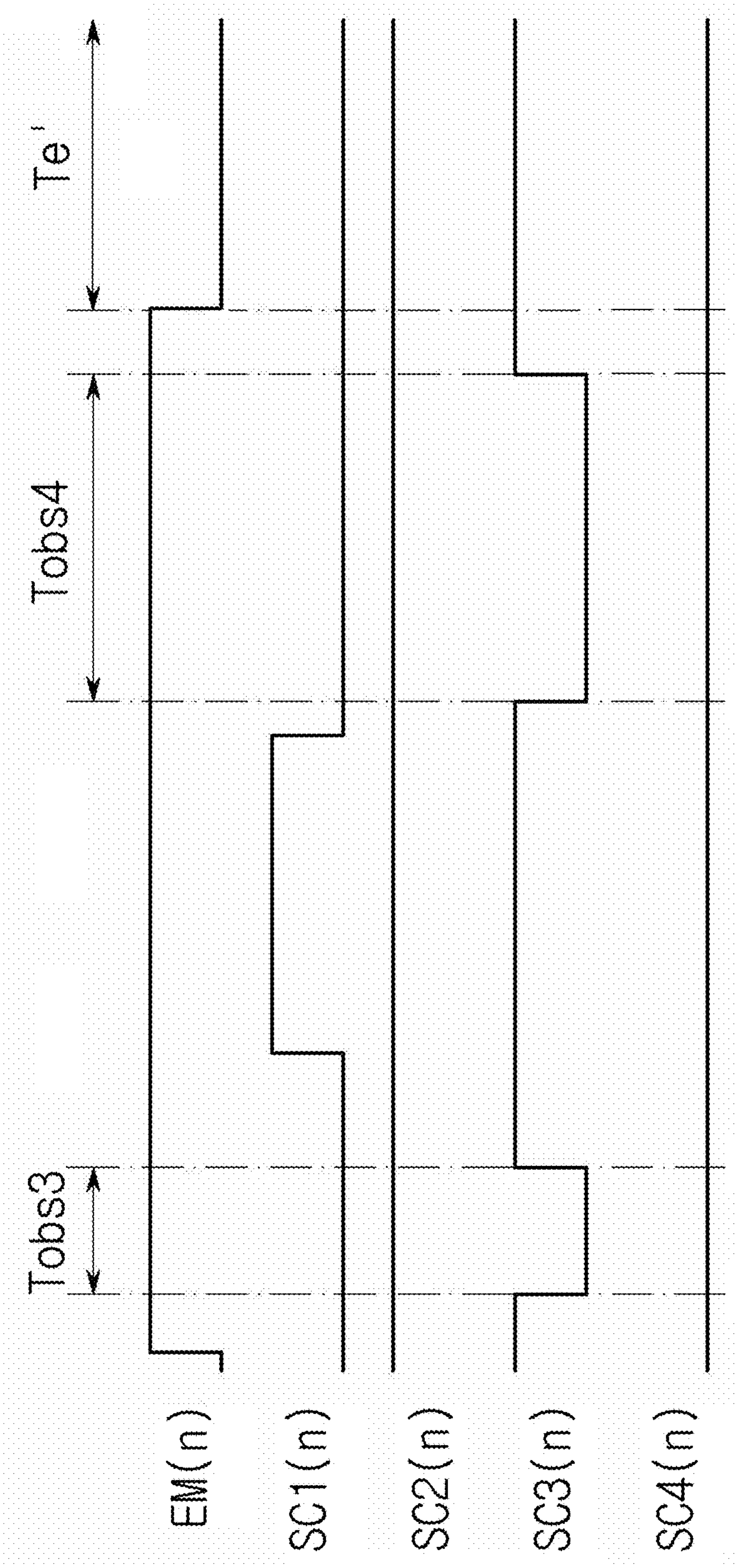
Figure 5C:
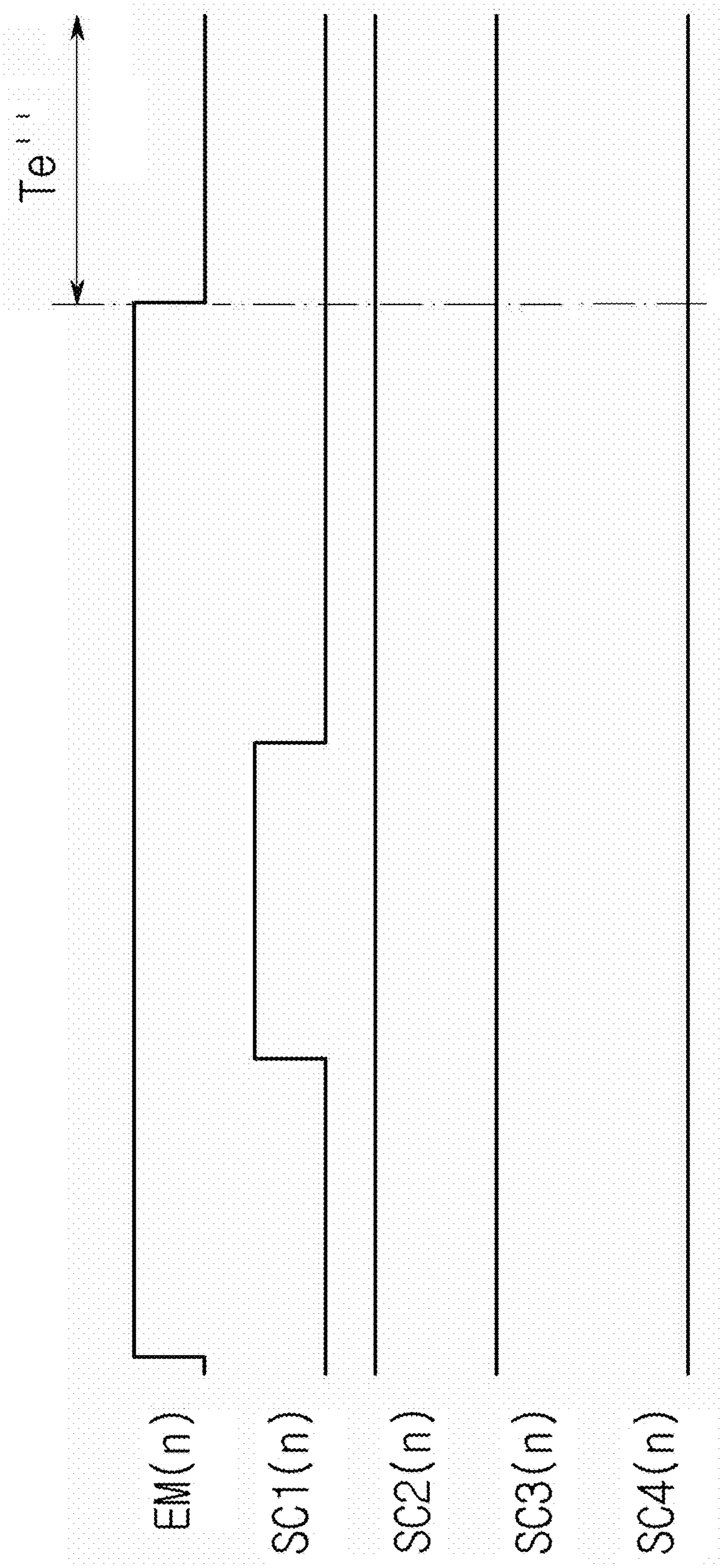

FIGS. 5A to 5C are views for describing operations of the scan signal and the emission control signal in a refresh period and a hold period in the pixel circuit shown in FIG. 4.

The display device according to the example embodiment of the present disclosure may operate as a variable refresh rate (VRR) mode display device. The VRR mode may drive the display device by increasing, at a point of time when high-speed driving is required, a refresh rate at which the data voltage Vdata is updated, while the display device is being driven at a constant frequency, or may drive a pixel by reducing the refresh rate at a point of time when it is necessary to reduce power consumption or when a low-speed driving is required.

Each of the plurality of pixels P may be driven through a combination of a refresh frame and a hold frame within one second. In the present disclosure, one set is defined as a combination of a refresh period in which the data voltage Vdata is updated and a hold period in which the data voltage Vdata is not updated that is repeated for one second. Also, one set period is a cycle in which the combination of the refresh period and the hold period is repeated.

When the refresh rate is 120 Hz, a period for the driving of the pixel may be composed of only the refresh period. That is, the refresh period may be repeated 120 times within one second. One refresh period is $\frac{1}{120}$=8.33 ms, and one set period is also 8.33 ms.

When the refresh rate is 60 Hz, a period for the driving of the pixel may be composed of alternating the refresh period and the hold period. That is, the refresh period and the hold period may be alternately repeated 60 times each within one second. One refresh period and one hold period are 0.5/60=8.33 ms respectively, and one set period is 16.66 ms.

When the pixel is driven at the refresh rate of 1 Hz, one frame may be composed of one refresh period and 119 hold periods after the one refresh period. Also, when the pixel is driven at the refresh rate of 1 Hz, one frame may be composed of a plurality of refresh periods and a plurality of hold periods. Here, one refresh period and one hold period are $1/120$=8.33 ms respectively, and one set period is 1s. Embodiments are not limited thereto. As an example, the pixel may also be driven at any refresh rate that is lower than 60 Hz or 50 Hz other than 1 Hz.

In the refresh period, a new data voltage Vdata is charged and applied to the driving transistor DT. In the hold period, the data voltage Vdata of the previous frame is maintained and used. Meanwhile, the hold period is also referred to as a skip period in which a process of applying a new data voltage Vdata to the driving transistor DT is omitted.

Each of the plurality of pixels P may initialize a voltage which is charged or remains in the pixel circuit during the refresh period. Specifically, each of the plurality of pixels P may remove the influence of the high potential driving voltage EVDD and the data voltage Vdata stored in the previous frame during the refresh period. Accordingly, each of the plurality of pixels P may display an image corresponding to the new data voltage Vdata in the hold period.

Each of the plurality of pixels P may display an image by supplying a driving current corresponding to the data voltage Vdata to the light emitting element EL during the hold period, and may maintain the turn-on state of the light emitting element EL.

First, the driving of the pixel circuit and the light emitting element in the refresh period of FIG. 5A will be described. The refresh period may include at least one of bias sections Tobs1 and Tobs2, an initialization period Ti, a sampling period Ts, and a light emission period Te. However, this is just an example and is not necessarily limited to this order.

Referring to FIG. 5A, the pixel circuit may operate in at least one of the bias sections Tobs1 and Tobs2 during the refresh period.

In the at least one of the bias sections Tobs1 and Tobs2, an on-bias stress OBS operation to which the bias voltage Vobs is applied is performed. Also, the emission control signal EM(n) is at a high voltage, and the third and fourth transistors T3 and T4 perform an off-operation. The first scan signal SC1(n) and the fourth scan signal SC4(n) are at a low voltage, and the first transistor T1 and the seventh transistor T7 perform an off-operation. The second scan signal SC2 is at a high voltage, and the second transistor T2 performs an off-operation.

The third scan signal SC3(n) having a low voltage is input, and the fifth and sixth transistors T5 and T6 are turned on. As the fifth transistor T5 is turned on, the bias voltage Vobs is applied to the first electrode of the driving transistor DT connected to the second node N2.

Here, the bias voltage Vobs is supplied to the third node N3 that is the drain electrode of the driving transistor DT, so that a voltage charging time or charging delay of the fifth node N5 that is the anode electrode of the light emitting element EL can be reduced in the light emission period. The driving transistor DT maintains stronger saturation.

For example, as the bias voltage Vobs increases, the voltage of the third node N3 that is the drain electrode of the driving transistor DT may increase and a gate-source voltage or a drain-source voltage of the driving transistor DT may decrease. Therefore, it is preferable that the bias voltage Vobs is at least higher than the data voltage Vdata.

Here, the magnitude of the drain-source current Id passing through the driving transistor DT may be reduced, and the stress of the driving transistor DT may be reduced in a positive bias stress condition, thereby eliminating the charging delay of the voltage of the third node N3. In other words, the on-bias stress OBS operation is performed before the threshold voltage Vth of the driving transistor DT is sampled, so that hysteresis of the driving transistor DT can be reduced.

Accordingly, the on-bias stress OBS operation in at least one of the bias sections Tobs1 and Tobs2 may be defined as an operation of directly applying an appropriate bias voltage to the driving transistor DT during non-light emission periods.

In addition, as the sixth transistor T6 is turned on in at least one of the bias sections Tobs1 and Tobs2, the anode electrode (or pixel electrode) of the light emitting element EL connected to the fifth node N5 is initialized to the first initialization voltage Var.

However, the gate electrodes of the fifth and sixth transistors T5 and T6 may receive separate scan signals and be independently controlled. That is, it is not required to simultaneously apply the bias voltage to the first electrode of the driving transistor DT and the anode electrode of the light emitting element EL in the bias section.

Referring to FIG. 5A, the pixel circuit may operate in the initialization period Ti during the refresh period. The voltage of the gate electrode of the driving transistor DT is initialized in the initialization period Ti.

The first scan signal SC1(n) to the fourth scan signal SC4(n) and the emission control signal EM(n) are at a high voltage, and the first transistor T1 and the seventh transistor T7 are turned on. The second to sixth transistors T2, T3, T4, T5, and T6 are turned off. As the first and seventh transistors T1 and T7 are turned on, the second electrode and the gate electrode of the driving transistor DT connected to the first node N1 are initialized to the second initialization voltage Vini.

Referring to FIG. 5A, the pixel circuit may operate in the sampling period Ts during the refresh period. The threshold voltage Vth of the driving transistor DT is sampled in the sampling period.

The first scan signal SC1(n), the third scan signal SC3(n), and the emission control signal EM(n) are at a high voltage, and the second scan signal SC2(n) and the fourth scan signal SC4(n) having a low voltage are input. Accordingly, the third to seventh transistors T3, T4, T5, T6, and T7 are turned off, the first transistor T1 remains in the on-state, and the second transistor T2 is turned on. That is, the second transistor T2 is turned on, the data voltage Vdata is applied to the driving transistor DT, and the first transistor T1 diode-connect the driving transistor DT between the first node N1 and the third node N3, so that the threshold voltage Vth of the driving transistor DT can be sampled.

Referring to FIG. 5A, the pixel circuit may operate in the light emission period Te during the refresh period. In the light emission period Te, the sampled threshold voltage Vth is offset and the light emitting element EL emits light with a driving current corresponding to the sampled data voltage.

The emission control signal EM(n) is at a low voltage, and the third and fourth transistors T3 and T4 are turned on.

As the third transistor T3 is turned on, the high potential driving voltage EVDD connected to the fourth node N4 is applied to the first electrode of the driving transistor DT connected to the second node N2 through the third transistor T3. The driving current Id supplied from the driving transistor DT to the light emitting element EL via the fourth transistor T4 becomes irrelevant to the value of the threshold voltage Vth of the driving transistor DT, so that the threshold voltage Vth of the driving transistor DT is compensated and the driving transistor operates.

Next, referring to FIG. 5B, the driving of the pixel circuit and the light emitting element in the hold period will be described.

The hold period may include at least one of bias sections Tobs3 and Tobs4 and a light emission period Te'. The description of the same operation of the pixel circuit as the operation of the refresh period will be omitted.

As described above, in the refresh period, a new data voltage Vdata is charged and applied to the gate electrode of the driving transistor DT. Whereas, the hold period is different from the refresh period in that the data voltage Vdata in the refresh period is maintained and used. Therefore, unlike the refresh period, the hold period does not require the initialization period T1 and the sampling period Ts.

In the hold period, it may be enough as long as the on-bias stress OBS operation is performed even only one time. However, in the embodiment, for convenience of the driving circuit, the third scan signal SC3(n) in the hold period is driven in the same manner as the third scan signal SC3(n) in the refresh period. This results in that the on-bias stress OBS operation may be performed twice, as in the refresh period.

A difference between the driving signal in the refresh period described with reference to FIG. 5A and the driving signal in the hold period in FIG. 5B results from the second and fourth scan signals SC2(n) and SC4(n). The hold period does not require the initialization period T1 and the sampling period Ts. Therefore, unlike the refresh period, the second scan signal SC2(n) is always at a high voltage, and the fourth scan signal SC4(n) is always at a low voltage. That is, the second and seventh transistors T2 and T7 are always turned off.

FIG. 5C shows the driving of the light emitting device and the pixel circuit that does not perform the on-bias stress OBS operation in the hold period of FIG. 5B.

Referring to FIG. 5C, the pixel circuit may operate in only the emission period Te" during the hold period. In other words, in the pixel circuit, the on-bias stress OBS operation is not performed during the hold period, the second scan signal SC2(n) and the third scan signal SC3(n) are always at a high voltage, and the fourth scan signal SC4(n) is always at a low voltage. That is, the second transistor T2 and the fifth to seventh transistors T5, T6, and T7 are always turned off.

The embodiment in which the on-bias stress OBS operation is not performed during the hold period will be described in detail with reference to FIGS. 7 to 10.

Figure 6:
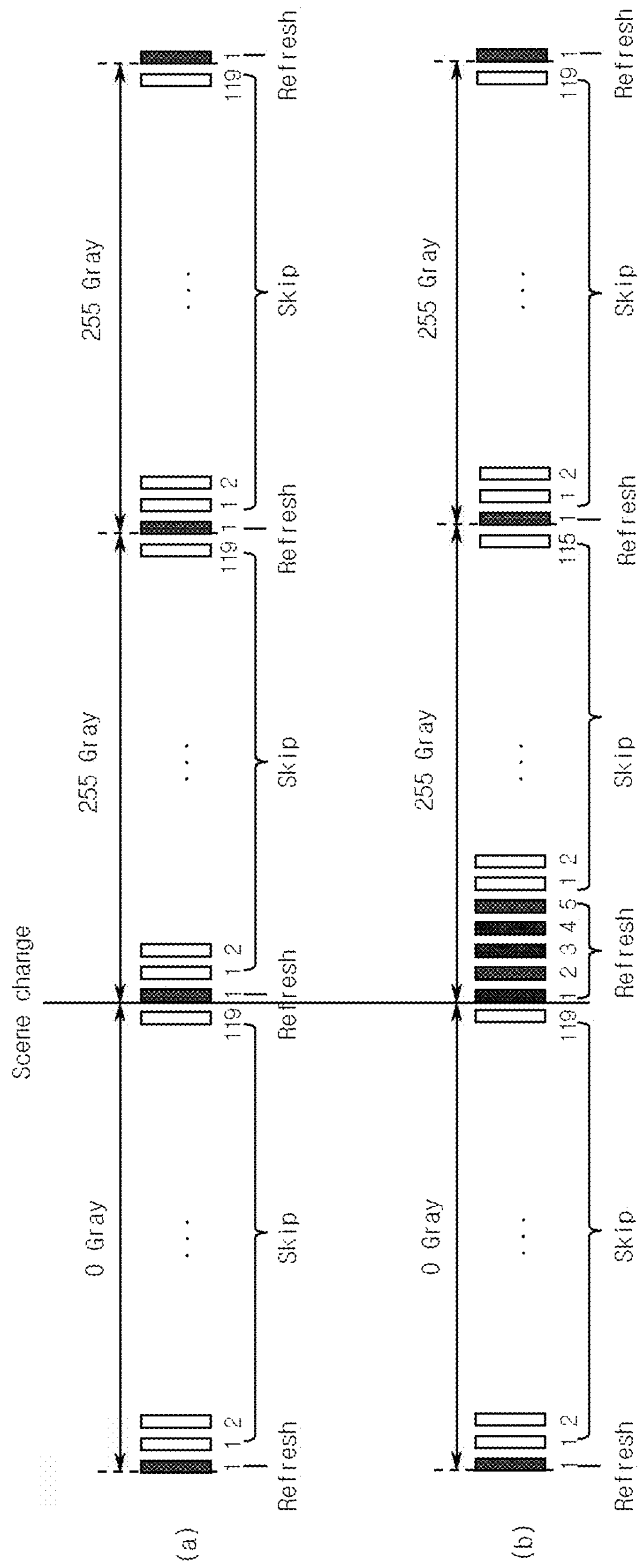
FIG. 6 is a view for describing multi-refresh driving when low-frequency driving is performed in a VRR mode according to an example embodiment of the present disclosure.

FIG. 6 is a view for describing multi-refresh driving when low-frequency driving is performed in the VRR mode according to an embodiment of the present disclosure. Although the refresh rate in the low-frequency driving is illustrated as 1 Hz, other frequency such as 2 Hz, 5 Hz, 10 Hz or 20 Hz lower than 50 Hz or 60 Hz is also possible.

Referring to FIG. 6, the refresh period having the same image data is repeated within one frame, so that a time required for display luminance to reach a target level during the low-frequency driving is reduced, and abnormal phenomena such as flicker are reduced or minimized.

Since a cycle in which the pixel circuit is refreshed in driving at a low frequency such as a refresh rate of 1 Hz is increased, some transistors are implemented with oxide transistors with good off current characteristics in order to reduce or minimize leakage current. The oxide transistor is effective in reducing leakage current due to low off-current, but has a relatively slow response speed due to a lower electron mobility than that of a polycrystalline silicon transistor.

Namely, as shown in (a) in FIG. 6, in a case where one frame is composed of one refresh period and 119 hold periods, when gradation change of the image or scene change occurs, a delay for the display luminance to reach a target level may occur.

Accordingly, after the gradation change of the image, the plurality of refresh periods is, as shown in (b) in FIG. 6, included in the first frame, so that the time required for the display luminance to reach a target level can be shortened. For example, after the gradation change of the image, the first frame may include five refresh periods and 115 hold periods having the same image data. However, the number of refresh periods and the number of hold periods in one frame are not limited thereto. As such, having the plurality of refresh periods during the low-frequency driving may be referred to as multi-refresh driving.

FIGS. 7 to 10 are views for describing a luminance deviation compensation driving method in the display device according to the embodiment of the present disclosure.

During the low-frequency driving with the refresh rate of 1 Hz, the bias voltage Vobs applied to compensate for the threshold voltage Vth of the driving transistor DT during the hold period is accumulated as a stress voltage of the driving transistor DT. As the number of times the bias voltage Vobs is applied to the driving transistor DT increases, the charge of the driving transistor DT increases and the driving transistor is saturated. That is, in one frame, the driving transistor DT is initialized by including the initialization period Ti in only one refresh period, so that the on-bias stress is accumulated in the remaining 119 hold periods.

Since the accumulation of the on-bias stress results from the bias voltage Vobs in the hold period, the accumulation of the on-bias stress also occurs in the multi-refresh driving with the plurality of refresh periods. Accordingly, as a result, the accumulation of the on-bias stress changes the characteristics of the driving transistor DT, and thus, reduces the magnitude of the driving current Id and degrades the luminance.

In addition, during the scene change, the threshold voltage Vth of the driving transistor DT may be temporarily changed and then restored to its original state. As an example, the threshold voltage Vth is changed in the first frame after the scene change such as the gradation change of the image, and thus, the luminance of the light emitting element EL may be decreased. This is recognized as flicker by a user at a point of time when the gradation of the image is changed.

As described above, during the low-frequency driving with the refresh rate of 1 Hz, in order to improve the luminance degradation due to both the change in the threshold voltage Vth of the driving transistor and the luminance degradation due to the change in the characteristics of the driving transistor DT caused by the accumulation of the bias voltage Vobs for compensating for the threshold voltage Vth, the on-bias stress OBS operation may not be performed during the hold period of the first frame after the gradation change of the image. The on-bias stress OBS operation may not be performed in various embodiments shown in FIGS. 7 to 10.

Figure 7:
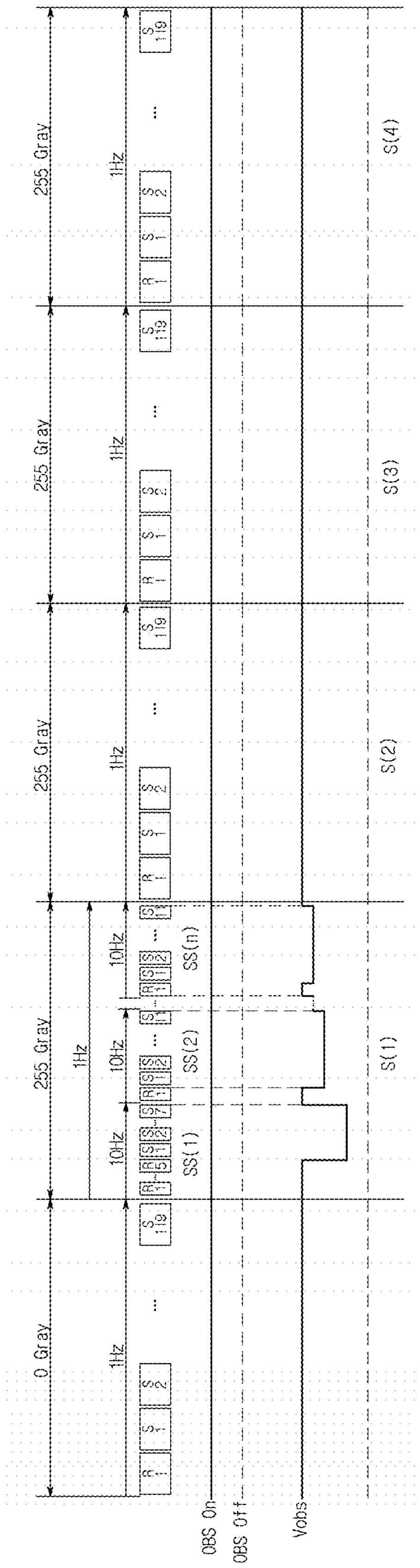
FIGS. 7 to 10 are views for describing a luminance deviation compensation driving method in the display device according to the example embodiment of the present disclosure.

Referring to FIG. 7, the display device may be driven by varying the bias voltage Vobs in stages during the hold period of a plurality of frames after the scene change, and simultaneously, by varying the refresh rate.

As an example, the power supply 500 may apply the bias voltage Vobs lower than a certain level during the hold period of the first frame after the gradation change of the image in the display device 10 being driven at the first refresh rate, and then may operate such that the bias voltage Vobs in the hold period is varied to increase in stages to the level of the bias voltage Vobs in the refresh period. Also, while the bias voltage Vobs is varied to increase in stages, the display device 10 may operate with the change of the refresh rate to the second refresh rate.

Here, the bias voltage Vobs applied during the refresh period may be at a first level, and the bias voltage Vobs applied during the hold period of the first frame after the gradation change of the image may be at a second level lower than the first level. Also, the second refresh rate may be higher than the first refresh rate.

Referring to FIG. 7, in the low-frequency driving with the first refresh rate, when one set S is defined in units of frames, the first frame after the gradation change of the image may be a first set S(1), and the second frame may be a second set S(2), and the n-th frame may be an n-th set S(n). Also, the first set S(1) may include a plurality of subsets SS(1) to SS(n) having the second refresh rate. Each of the plurality of subsets SS(1) to SS(n) may include at least one refresh period and a plurality of hold periods.

In addition, during the hold period of the plurality of subsets SS(1) to SS(n), the bias voltage Vobs that is varied to increase in stages from the second level to the first level is applied. In the plurality of hold periods of each of the subsets SS, the bias voltage Vobs may have the same voltage level.

For example, the first refresh rate may be 1 Hz and the second refresh rate may be 10 Hz. Since the display device is driven at 10 Hz in the plurality of subsets SS(1) to SS(n) included in the first set S(1), the display device may operate in six subsets SS(1) to SS(6) with the refresh rate of 10 Hz during the first set S(1) of 1 Hz. The bias voltages Vobs of different voltage levels may be applied to each of the six subsets SS(1) to SS(6). As an example, the bias voltages Vobs of different voltage levels applied to each of the six subsets SS(1) to SS(6) may be increased sequentially.

That is, as shown in FIG. 7, after the gradation change of the image, the first set S(1) with the first refresh rate includes the plurality of subsets SS(1) to SS(n) with the second refresh rate, and as a result, the accumulation of the on-bias stress and the change of the threshold voltage Vth of the driving transistor DT are reduced, so that flicker can be reduced.

Figure 8:
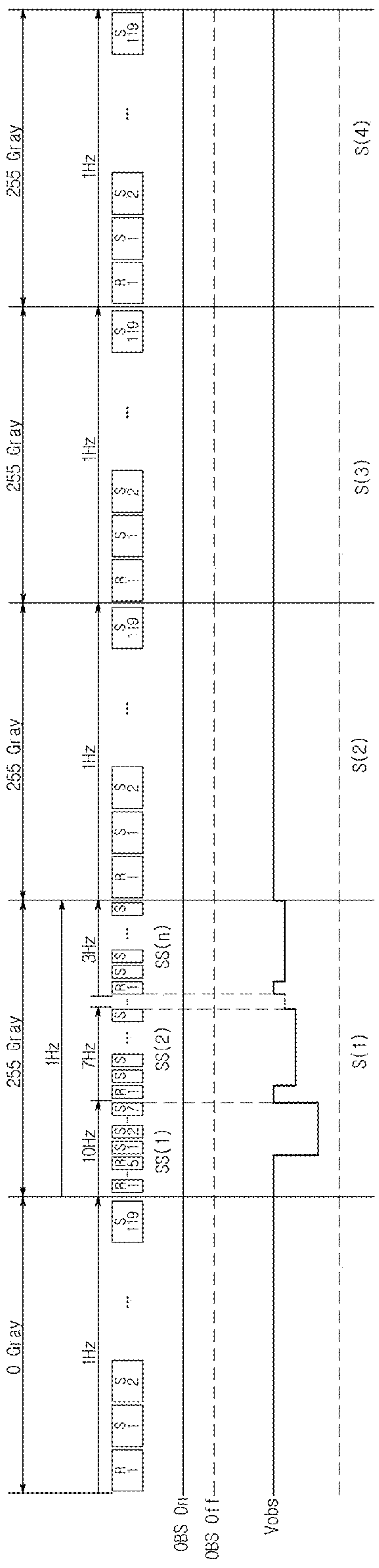

Referring to FIG. 8, the display device may operate at different refresh rates in each of the plurality of subsets SS(1) to SS(n).

As an example, in the first set S(1) after the gradation change of the image in the display device 10 being driven at the first refresh rate, the bias voltage Vobs may be varied to increase in stages from the second level to the first level in the hold period of the plurality of subsets SS(1) to SS(n), the display device may operate at different refresh rates in each of the plurality of subsets SS(1) to SS(n). As an example, the different refresh rates in each of the plurality of subsets SS(1) to SS(n) may be decreased sequentially.

For example, the display device may be driven in the first set S(1) at the first refresh rate of 1 Hz, in the first subset SS(1) at the refresh rate of 10 Hz, in the second subset SS(2) at the refresh rate of 7 Hz, and in the n-th subset SS(n) at the refresh rate of 3 Hz.

That is, as shown in FIG. 8, after the gradation change of the image, the first set S(1) with the first refresh rate includes the plurality of subsets SS(1) to SS(n) with a variable refresh rate, and as a result, the accumulation of the on-bias stress and the change of the threshold voltage Vth of the driving transistor DT are reduced, so that flicker can be reduced.

Also, as shown in FIGS. 7 and 8, the plurality of subsets SS in which the level of the bias voltage Vobs is varied can be selectively changed until the next frame or the gradation change of the next image occurs. Also, in each of the refresh periods of the plurality of subsets SS, the bias voltage Vobs may be constantly maintained at the first level without being changed.

Figure 9:
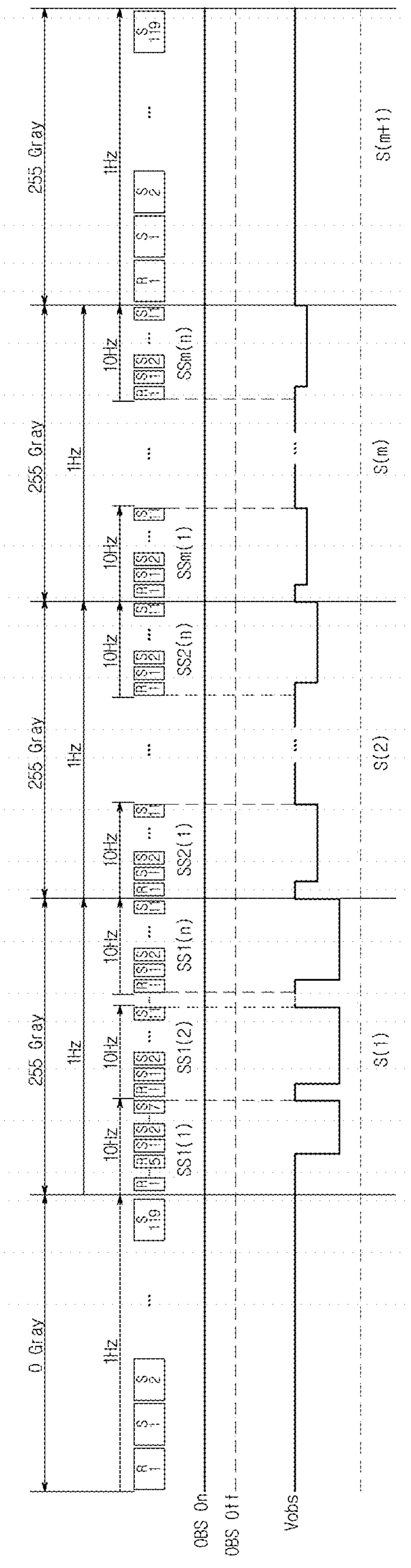

Referring to FIG. 9, the display device may be driven by varying the bias voltage Vobs in stages during the hold period of a plurality of frames after the scene change, and optionally, simultaneously, by varying the refresh rate.

Here, the plurality of sets S(1) to S(m) in which the display device is driven at the first refresh rate may include a plurality of subsets SS1(1) to SS1(n), SS2(1) to SS2(n), and SSm(1) to SSm(n) in which the display device is driven at the second refresh rate respectively. Each of the plurality of subsets SS1(1) to SS1(n), SS2(1) to SS2(n), and SSm(1) to SSm(n) may include at least one refresh period and a plurality of hold periods.

In addition, during the hold period of the plurality of sets S(1) to S(m), the bias voltage Vobs that is varied to increase in stages from the second level to the first level is applied. The bias voltage Vobs applied during the hold period may have the same voltage level in each of the plurality of subsets SS1(1) to SS1(n), SS2(1) to SS2(n), or SSm(1) to SSm(n) included in the plurality of sets S(1) to S(m).

For example, the first refresh rate may be 1 Hz and the second refresh rate may be 10 Hz. Since the display device is driven at 10 Hz in the plurality of subsets SS1(1) to SS1(n), SS2(1) to SS2(n), and SSm(1) to SSm(n) included in the plurality of sets S(1) to S(m) respectively, the display device may operate in six subsets SSm(1) to SSm(6) with the refresh rate of 10 Hz during the set S of 1 Hz. The bias voltages Vobs of different voltage levels may be applied to each of the plurality of sets S(1) to S(m). Alternatively, the bias voltages Vobs of different voltage levels may be applied to each of the plurality of subsets SS1(1) to SS1(n), to each of the plurality of subsets SS2(1) to SS2(n) or to each of the plurality of subsets SSm(1) to SSm(n).

In addition, the display device may operate such that the bias voltages Vobs of different voltage levels is applied to the plurality of subsets SS1(1) to SS1(6) of the first set S(1) to the plurality of subsets SSm(1) to SSm(n) of the m-th set S(m) and such that the bias voltages Vobs is varied to increase in stages from the second level to the first level.

That is, as shown in FIG. 9, after the gradation change of the image, the plurality of sets S(1) to S(m) with the first refresh rate includes the plurality of subsets SS1(1) to SS1(n) . . . SSm(1) to SSm(n) having the second refresh rate. The power supply 500 is driven such that the bias voltage Vobs is varied over the plurality of sets S(1) to S(m). As a result, the accumulation of the on-bias stress and the change of the threshold voltage Vth of the driving transistor DT are reduced, so that flicker can be reduced.

Figure 10:
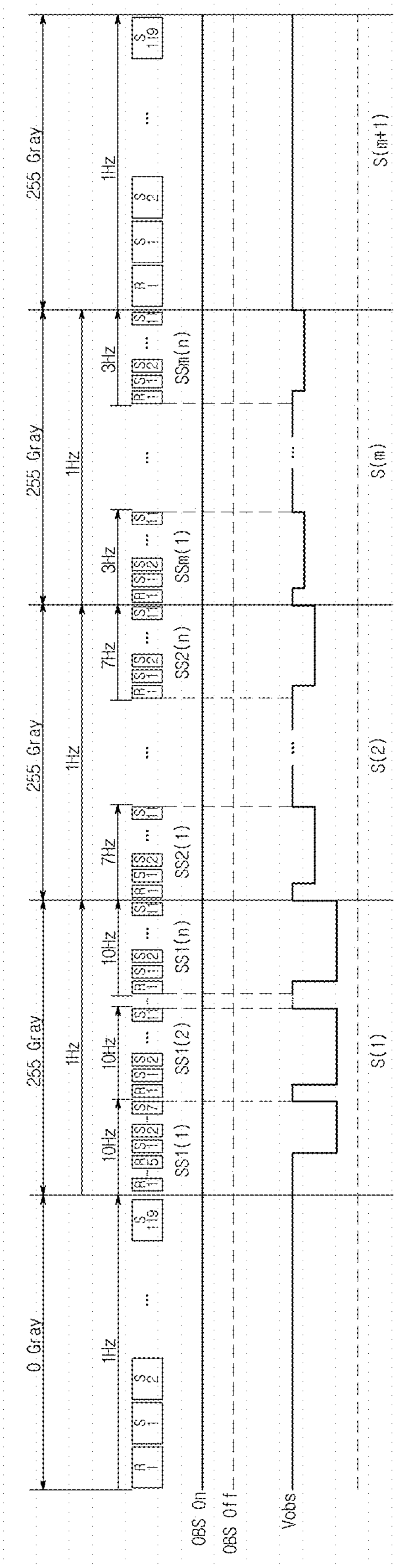

Referring to FIG. 10, the display device may operate at different refresh rates in each of the plurality of sets S(1) to S(m).

As an example, after the gradation change of the image, the plurality of sets S(1) to S(m) in which the display device operates at the first refresh rate may include the plurality of subsets SS1(1) to SS1(n), SS2(1) to SS2(n), and SSm(1) to SSm(n) having different refresh rates, respectively.

For example, when the display device is driven at the first refresh rate of 1 Hz in each of the plurality of sets S(1) to S(m), the display device may operate at the first refresh rate of 10 Hz in the plurality of subsets SS1(1) to SS1 (n) of the first set S(1), at the first refresh rate of 7 Hz in the plurality of subsets SS2(1) to SS2(n) of the second set S(2), and at the first refresh rate of 3 Hz in the plurality of subsets SSm(1) to SSm(n) of the m-th set S (m).

That is, as shown in FIG. 10, after the gradation change of the image, the plurality of sets S(1) to S(m) with the first refresh rate includes the plurality of subsets SS1(1) to SS1(n) SS2(1) to SS2(n), and SSm(1) to SSm(n) having different refresh rates. The power supply 500 is driven such that the bias voltage Vobs is varied over the plurality of sets S(1) to S(m). As a result, the accumulation of the on-bias stress and the change of the threshold voltage Vth of the driving transistor DT are reduced, so that flicker can be reduced.

Also, as shown in FIGS. 9 and 10, the plurality of sets S in which the level of the bias voltage Vobs is varied can be selectively changed until the following frames or the gradation change of the next image occurs. Also, in each of the refresh periods of the plurality of sets S and subsets SS, the bias voltage Vobs may be constantly maintained at the first level without being changed.

Also, referring to FIGS. 7 to 10, when the bias voltage Vobs of the hold period is set to be about 2 V lower than the bias voltage Vobs of the refresh period, the same effect as an effect in which the on-bias stress OBS operation is turned off can be obtained. For example, if the bias voltage Vobs of the first level is 7 V during the refresh period, the bias voltages Vobs of the second to fourth levels may be about 5 V during the hold period, and the bias voltage may be varied to increase in stages between 5 V and 7V until the next frame or the gradation change of the next image may occur. But embodiments are not limited thereto. As an example, the bias voltage Vobs of the hold period may be lower than the bias voltage Vobs of the refresh period by any voltage lower or higher than 2V. In addition, the refresh rates described above or illustrated in the drawings are illustrative, and refresh rates other than 1 Hz, 10 Hz, 7 Hz, 3 Hz could be adopted, as long as the refresh rates are lower than 60 Hz.

Figure 11:
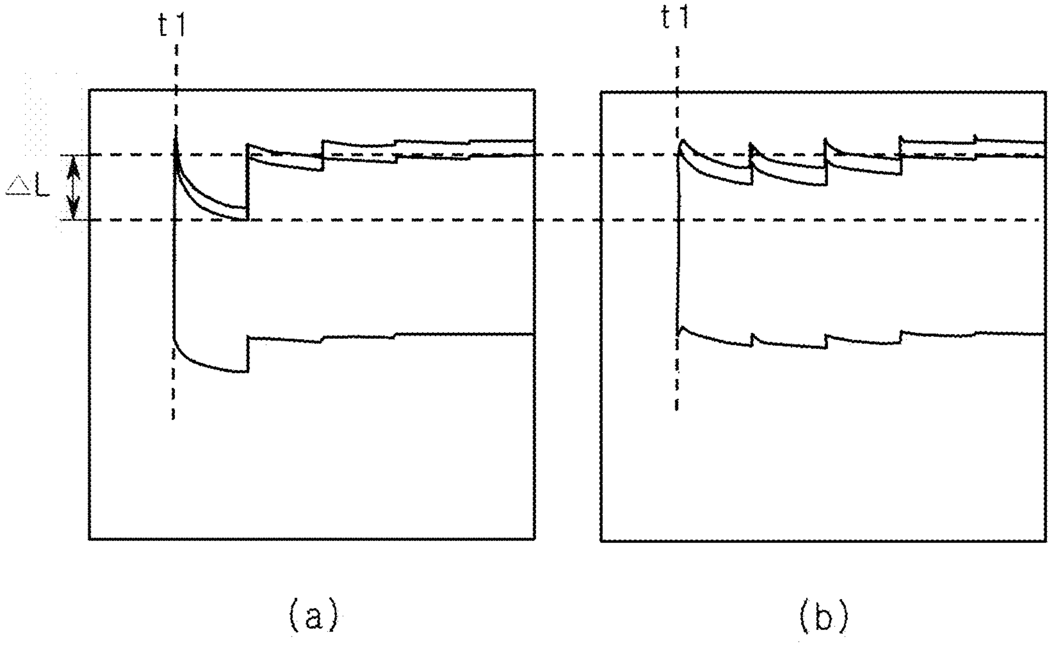
FIG. 11 is a view showing effects when the luminance deviation compensation driving is applied according to the example embodiment of the present disclosure.

FIG. 11 is a view showing effects when the luminance deviation compensation driving is applied according to the example embodiment of the present disclosure.

A general luminance change amount ΔL at a point of time t1 when the gradation of an image changes is shown in (a) of FIG. 11. A case in which luminance deviation compensation driving according to the embodiment of the present disclosure is applied is shown in (b) of FIG. 11. As can be seen in FIG. 11, when the luminance deviation compensation driving is performed, the luminance change amount ΔL is not great even though the gradation change of the image occurs, so that flicker due to the luminance deviation can be reduced.

The display device according to the embodiment of the present disclosure may be described as follows.

The display device according to the embodiment of the present disclosure includes: a display panel that includes a display area where a plurality of pixels is disposed and a non-display area disposed around the display area: a gate driver that provides a scan signal and an emission control signal to the display panel: and a controller that drives the display panel in accordance with a refresh rate. The plurality of pixels includes a light emitting element and a pixel circuit that drives the light emitting element. The pixel circuit is driven in sets including at least one refresh period and at least one hold period in low frequency driving. The controller controls dynamically the refresh rate during the at least one set when a gradation of an image changes, and simultaneously, changes and supplies a bias voltage during the at least one hold period.

In the controller during the at least one set, the display panel is driven at a first refresh rate in the low frequency driving and is driven at a second refresh rate when the gradation of the image changes.

The second refresh rate may be higher than the first refresh rate.

The set may include a plurality of subsets.

The display device may be driven at the first refresh rate in the set and may be driven at the second refresh rate in the plurality of subsets.

A sum of the second refresh rates may be the first refresh rate.

The bias voltage may have different voltage levels during the plurality of subsets.

Different refresh rates may be provided during the plurality of subsets.

The bias voltage may have the same voltage level during the plurality of subsets.

A first frame after the gradation change of the image may include a plurality of the refresh periods.

The pixel circuit may further include: a driving transistor of which a first electrode is configured to receive a data voltage and the bias voltage and a second electrode is connected to the light emitting element; a switching transistor that is connected between the driving transistor and a data line and applies the data voltage to the driving transistor in response to a first scan signal; and a bias transistor that applies the bias voltage to the driving transistor in response to a second scan signal.

The gate driver may include a first to a fourth scan drivers that apply a first to a fourth scan signals to the pixel circuit and an emission control signal driver that applies the emission control signal. The second scan driver may include a second odd-numbered scan driver and a second even-numbered scan driver.

The display panel may include: a bias voltage bus line that applies the bias voltage to the pixel circuit; and an initialization voltage bus line that applies an initialization voltage to the pixel circuit. The bias voltage bus line and the initialization voltage bus line may be disposed between the gate driver and the display area.

The display area may include one or more optical areas having a light-transmission structure formed therein and general areas other than the one or more optical areas.

The one or more optical areas may overlap optical electronics.

A resolution of the one or more optical areas may be lower than that of the general area.

A display device according to the embodiment of the present disclosure may include: a display panel including a plurality of pixels; and a controller that controls driving of the display panel in accordance with a refresh rate. The display panel may be driven in sets including at least one refresh period and at least one hold period in low frequency driving. In a first set after a gradation change of an image, the controller may drive the display panel such that the plurality of refresh periods is included.

The above description and accompanying drawings are merely illustrative of the spirit of the present disclosure. Various modifications and variations such as combination, separation, substitution, changes, etc., can be made within a range without departing from the essential characteristics of the present disclosure by those skilled in the art to which the present disclosure belongs. Accordingly, the embodiments disclosed in the present disclosure are for describing rather than for limiting the spirit of the present disclosure, and the scope of the spirit of the present disclosure is not limited by these embodiments. The protection scope of the present disclosure should be construed by the following claims, and all the technical spirit within the scope equivalent thereto should be construed as being included in the scope of the present disclosure.

Advantageous Effects

The display device according to the embodiment of the present disclosure reduces the deviation of the amount of the bias stress of the driving transistor at a time point of screen switching such as the gradation change, etc., of the image by the first to fourth methods of the luminance deviation compensation driving, so that the occurrence of difference in the luminance is reduced and flicker can be reduced.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

REFERENCE NUMERALS

100: Display Panel
200: Controller
300: Gate Driver
400: Data Driver
500: Power Supply

What is claimed is:

1. A display device, comprising:

a display panel that comprises a display area where a plurality of pixels is disposed; and a controller configured to drive the display panel in accordance with a refresh rate, wherein the plurality of pixels comprises a light emitting element and a pixel circuit configured to drive the light emitting element, wherein the pixel circuit is configured to be driven in sets including at least one refresh period and at least one hold period, wherein the controller is configured to change a bias voltage during the at least one hold period in at least one set when a gradation of an image changes, wherein the at least one set comprises a plurality of subsets, wherein the bias voltage is at a first voltage level during a first hold period of the plurality of subsets, wherein the bias voltage is at a second voltage level during a second hold period of the plurality of subsets, and wherein the second voltage level is different from the first voltage level.

2. The display device of claim 1, wherein, the controller is configured to simultaneously control dynamically the refresh rate during the at least one set.

3. The display device of claim 2, wherein, the display panel is configured to be driven at a first refresh rate before the at least one set and is configured to be driven at a second refresh rate during the at least one set when the gradation of the image changes.

4. The display device of claim 3, wherein the first refresh rate is lower than 50 Hz.

5. The display device of claim 3, wherein the second refresh rate is higher than the first refresh rate and lower than 50 Hz.

6. The display device of claim 1, wherein each of the plurality of subsets includes at least one refresh period and at least one hold period.

7. The display device of claim 1, wherein the display panel is configured to be driven at a first refresh rate in the at least one set and is configured to be driven at one or more second refresh rates in the plurality of subsets.

8. The display device of claim 7, wherein a combination of the one or more second refresh rates of the plurality of subsets is the first refresh rate.

9. The display device of claim 1, wherein the bias voltage has different voltage levels during hold periods of the plurality of subsets.

10. The display device of claim 9, wherein the different voltage levels of the bias voltage during the hold periods of the plurality of subsets are to increase in stages to a voltage level of the bias voltage during refresh periods of the plurality of subsets.

11. The display device of claim 9, wherein the bias voltage has a same voltage level during refresh periods of the plurality of subsets.

12. The display device of claim 9, wherein the display panel is configured to be driven at different refresh rates in the plurality of subsets.

13. The display device of claim 12, wherein the different refresh rates are to decrease sequentially in the plurality of subsets.

14. The display device of claim 1, wherein the bias voltage has a same voltage level during the plurality of subsets.

15. The display device of claim 14, wherein the display panel is configured to be driven at different refresh rates in the plurality of subsets.

16. The display device of claim 1, wherein a first frame after the gradation change of the image comprises a plurality of refresh periods.

17. The display device of claim 1, wherein the pixel circuit comprises:

a driving transistor of which a first electrode is configured to receive a data voltage and the bias voltage and a second electrode is connected to the light emitting element;

a switching transistor that is connected between the driving transistor and a data line and is configured to apply the data voltage to the driving transistor in response to a first scan signal; and a bias transistor that is configured to apply the bias voltage to the driving transistor in response to a second scan signal.

18. The display device of claim 1, further comprising a gate driver that is configured to provide a scan signal to the display panel;

wherein the gate driver comprises a first to a fourth scan drivers that are configured to apply a first to a fourth scan signals to the pixel circuit and an emission control signal driver that is configured to apply an emission control signal, and wherein the second scan driver comprises a second odd-numbered scan driver and a second even-numbered scan driver.

19. The display device of claim 1, further comprising a gate driver that is configured to provide a scan signal and an emission control signal to the display panel;

wherein the display panel further comprises:

a bias voltage bus line that is configured to apply the bias voltage to the pixel circuit; and an initialization voltage bus line that is configured to apply an initialization voltage to the pixel circuit, and wherein the bias voltage bus line and the initialization voltage bus line are disposed between the gate driver and the display area.

20. The display device of claim 1, wherein the display area comprises one or more optical areas having a light-transmission structure formed therein and general areas other than the one or more optical areas.

21. The display device of claim 20, wherein the one or more optical areas overlap optical electronics.

22. The display device of claim 20, wherein a resolution of the one or more optical areas is lower than a resolution of the general areas.

23. The display device of claim 1, wherein the bias voltage is to increase in stages during hold periods of a plurality of sets immediately after the gradation of the image changes.

24. The display device of claim 23, wherein in each of the plurality of set, the bias voltage has a same voltage level in each of the plurality of subsets.

25. The display device of claim 23, wherein refresh rates in the plurality of sets are to decrease sequentially.

26. The display device of claim 1, wherein the pixel circuit comprises a driving transistor of which a first electrode is configured to receive a data voltage and the bias voltage and a second electrode is connected to the light emitting element, and wherein the bias voltage is to be applied to the first electrode of the driving transistor before a sampling period in which a threshold voltage of the driving transistor is sampled in the at least one refresh period and is to be applied to the first electrode of the driving transistor before a light emission period in the at least one hold period.

27. The display device of claim 26, wherein the bias voltage is higher than the data voltage.

28. The display device of claim 1, wherein during the at least one set, the bias voltage of the at least one hold period is set to be 2 V lower than the bias voltage of the at least one refresh period.

29. A display device, comprising:

a display panel including a plurality of pixels; and a controller configured to control driving of the display panel in accordance with a refresh rate, wherein the display panel is configured to be driven in sets including at least one refresh period and at least one hold period, wherein at least one set of the sets, after a gradation change of an image, comprises a plurality of subsets including a first subset and a second subset, wherein the display device is configured to be driven at a first subset refresh rate in the first subset, wherein the display device is configured to be driven at a second subset refresh rate in the second subset, and wherein the second subset refresh rate is different from the first subset refresh rate.

30. The display device of claim 29, wherein in a first set after the gradation change of the image, the controller is configured to drive the display panel such that a plurality of refresh periods is included, and wherein the controller is configured to control dynamically the refresh rate during the at least one set after the gradation change of the image including the first set, and simultaneously, change and supply a bias voltage during the at least one hold period in the at least one set.

31. The display device of claim 30, wherein the display device is configured to be driven at a first refresh rate in the at least one set and is configured to be driven at one or more second refresh rates higher than the first refresh rate in the plurality of subsets, and wherein a combination of the one or more second refresh rates is the first refresh rate.

32. A display device, comprising:

a display panel comprising a display area where a plurality of pixels is disposed; and a controller configured to drive the display panel in accordance with a refresh rate, wherein the plurality of pixels comprises a light emitting element and a pixel circuit configured to drive the light emitting element, wherein the pixel circuit is configured to be driven in sets including at least one refresh period and at least one hold period, wherein the controller is configured to change a bias voltage during the at least one hold period in at least one set when a gradation of an image changes, wherein the at least one set comprises a plurality of subsets, wherein the display panel is configured to be driven at different refresh rates in the plurality of subsets, and wherein the different refresh rates are to decrease sequentially in the plurality of subsets.

33. A display device, comprising:

a display panel comprising a display area where a plurality of pixels is disposed; and a controller configured to drive the display panel in accordance with a refresh rate, wherein the plurality of pixels comprises a light emitting element and a pixel circuit configured to drive the light emitting element, wherein the pixel circuit is configured to be driven in sets including at least one refresh period and at least one hold period, wherein the controller is configured to change a bias voltage during the at least one hold period in at least one set when a gradation of an image changes, wherein the pixel circuit comprises a driving transistor, wherein a first electrode of the driving transistor is configured to receive a data voltage and the bias voltage, and a second electrode of the driving transistor is connected to the light emitting element, and wherein the bias voltage to be applied to the first electrode during a bias section period is higher than the data voltage.

* * * * *